(12) United States Patent
Sylor et al.

(10) Patent No.: US 7,415,671 B2
(45) Date of Patent: Aug. 19, 2008

(54) INTERACTIVE HIERARCHICAL STATUS DISPLAY

(75) Inventors: Mark W. Sylor, Nashua, NH (US);
Gordon Booman, Berlin, MA (US);
Richard Buttiglieri, Stow, MA (US);
Gary Pratt, Hudson, MA (US); Karen Whitehead, Boxborough, MA (US)

(73) Assignee: Computer Associates Think, Inc., Islandia, NY (US)

( * ) Notice: Subject to any disclaimer, the term of this patent is extended or adjusted under 35 U.S.C. 154(b) by 1327 days.

(21) Appl. No.: 09/988,976

(22) Filed: Nov. 19, 2001

(65) Prior Publication Data

US 2002/0186238 A1 Dec. 12, 2002

Related U.S. Application Data

(60) Provisional application No. 60/297,219, filed on Jun. 8, 2001.

(51) Int. Cl.
*G06F 13/00* (2006.01)
*G06F 15/00* (2006.01)

(52) U.S. Cl. .................. 715/736; 715/737; 709/209

(58) Field of Classification Search ............... 715/736, 715/737, 738, 763, 765, 853, 854; 709/209, 709/223
See application file for complete search history.

(56) References Cited

U.S. PATENT DOCUMENTS 5,475,819 A * 12/1995 Miller et al. ............... 709/203

| | | | |
|---|---|---|---|
| 5,684,967 A | 11/1997 | McKenna et al. | |
| 5,958,012 A | 9/1999 | Battat et al. | |
| 6,199,098 B1 * | 3/2001 | Jones et al. | 709/203 |
| 6,225,999 B1 | 5/2001 | Jain et al. | |
| 6,343,291 B1 | 1/2002 | Goldman | |
| 6,415,196 B1 | 7/2002 | Crampton et al. | |
| 2002/0083371 A1 * | 6/2002 | Ramanathan et al. | 714/37 |

FOREIGN PATENT DOCUMENTS

| JP | 11250135 A | 9/1999 |
|---|---|---|
| JP | 2000040021 | 2/2000 |

(Continued)

OTHER PUBLICATIONS

Shimaoka, Masaki, et al., KBSE97-36, Research Relating to Network Management Support Based on a Knowledge Base, Institute of Electronics, Information and Communications Engineers Technical Research Report, vol. 97, No. 632, Mar. 26, 1998, pp. 17-23.

(Continued)

*Primary Examiner*—Cao (Kevin) Nguyen
(74) *Attorney, Agent, or Firm*—Pillsbury Winthrop Shaw Pittman, LLP

(57) ABSTRACT

The invention features a method and apparatus for displaying the status of networked resources, including rendering in a fishbone layout a hierarchy that includes a plurality of resource profiles and a plurality of dependency relationships among resource profiles in the plurality of resource profiles, where the resource profiles represent networked resources. The invention also features a method and apparatus for displaying the status of networked resources, to include rendering fishbone layouts in a snowflake layout. Each fishbone layout features a hierarchy with resource profiles and dependency relationships among the resource profiles. The resource profiles represent networked resources. Hierarchies in the snowflake layout share a common root.

48 Claims, 9 Drawing Sheets

FOREIGN PATENT DOCUMENTS

| | | |
|---|---|---|
| JP | 2 344 963 | 6/2000 |
| JP | 2001005793 | 1/2001 |

OTHER PUBLICATIONS

"Ishikawa Diagram", printed from http://mot.vuse.vanderbilt.edu/mt322/ishikawa.htm, printed on Mar. 23, 2001, 3 pages.

"Cause and Effect Diagram", printed from http://deming.eng.clemson.edu/pub/tutorials/qctools/cedm.htm, printed on Mar. 23, 2001, 3 pages.

"Fishbone Diagram (Decision Process Guidebook)", printed from http://www.usbr.gov/guide/toolbox/fishbone.html, printed Mar. 23, 2001, 2 pages.

"The Cause and Effect, Ishikawa, or Fishbone Diagram", SkyMark, printed from http://www.skymark.com/resources/tools/cause.asp, printed Mar. 23, 2001, 2 pages.

"Cause and Effect Diagram, Ishikawa Diagram, or Fishbone Diagram", printed from http://mielsvr2.ecs.umass.edu/virtual_econ/module2/cause_effect.htm, printed Mar. 23, 2001, 2 pages.

"Fishbone Diagram - Technical Support", SmartDraw.com, printed from http://www.smartdraw.com/drawing/orgcharts/cool_fishbone2.html, printed Mar. 23, 2001, 1 page.

"Fishbone Diagram; a Problem-Analysis Tool", printed from http://sites.state.pa.us/PA_Exec/Lieutenant_Governor/prime/fish.html, printed Mar. 23, 2001, 2 pages.

"Fishbone Diagram", The Training Guide.com, Training Library, printed from http://www.thetrainingguide.com/library-index/lib-f/fishbone%20diagram.htm, printed Mar. 23, 2001, 1 page.

Simon, Kerri, "The Cause and Effect Diagram (a.k.a. Fishbone)", iSixSigma LLC, printed from http://www.isixsigma.com/library/content/t000827.asp, copyright 2000-2001, 3 pages.

"NCDENR Qaulity Initiative Fishbone Diagram", A Problem-Analysis Tool, printed from http://quality.enr.state.nc.us/tools/fishbone.htm, printed Mar. 23, 2001, 2 pages.

"Introduction to SPC", Chemical and Process Engineering, University of Newcastle Upon Tyne, printed from http://lorien.ncl.ac.uk/ming/spc/spc6.html, printed on Mar. 23, 2001, 1 page.

* cited by examiner

FIG. 3B (PRIOR ART GUI)

FIG. 9A (PRIOR ART DIRECTED TREE)
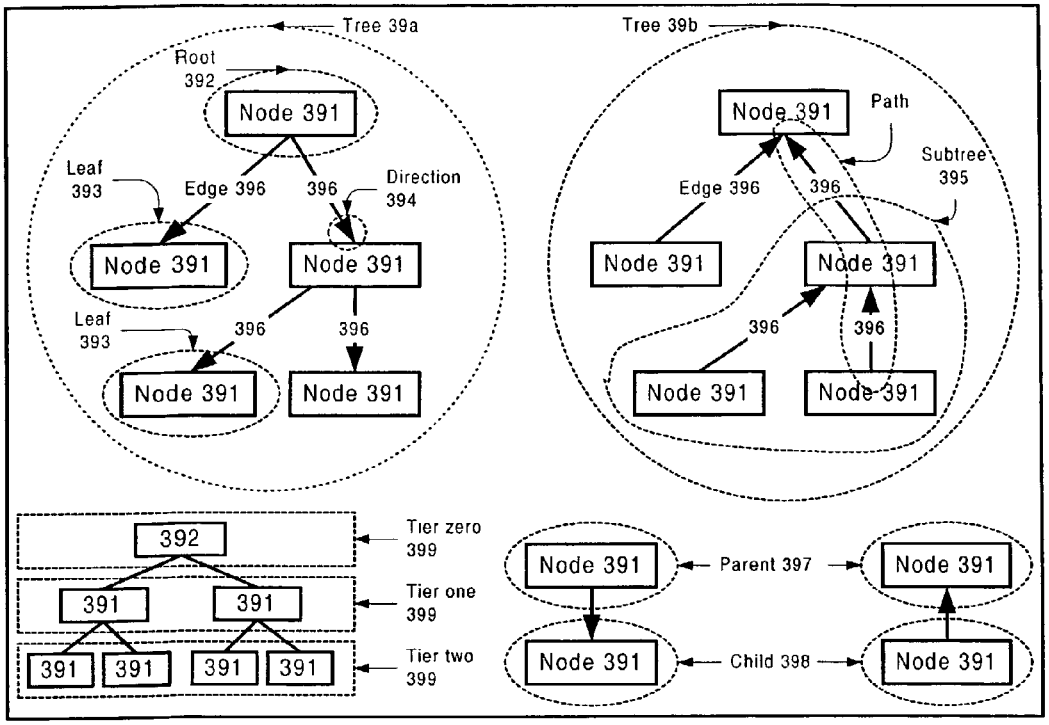
FIG. 9B
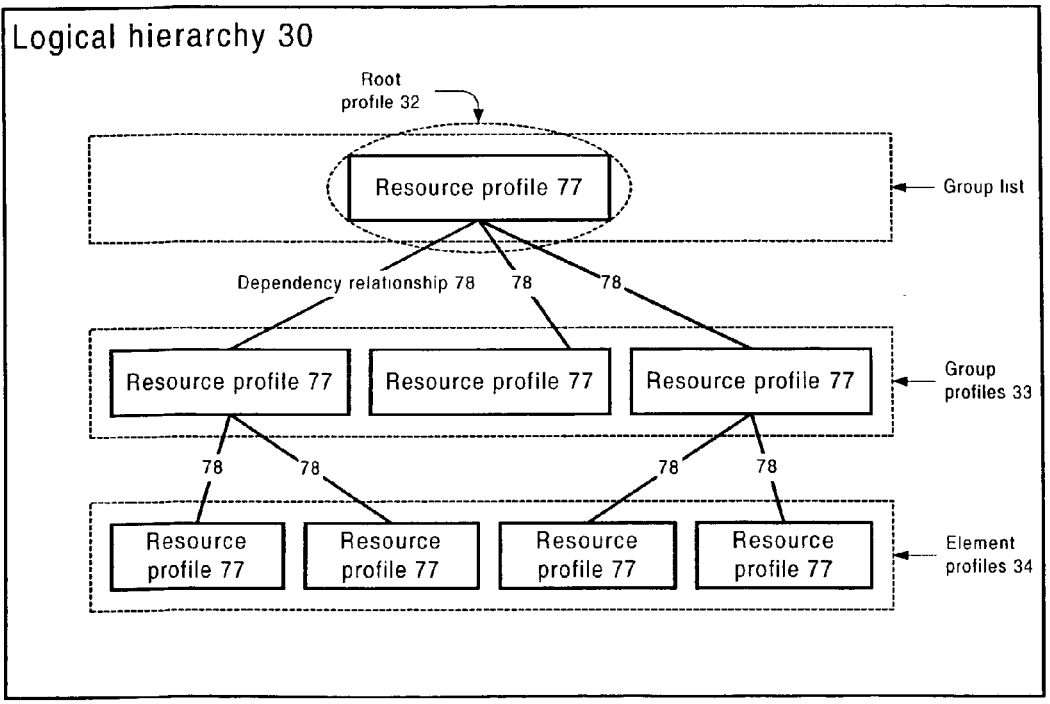

INTERACTIVE HIERARCHICAL STATUS DISPLAY

CLAIM OF PRIORITY

This application claims priority under 35 USC §119(e) to U.S. patent application Ser. No. 60/297,219 filed Jun. 8, 2001, the entire contents of which are hereby incorporated by reference.

TECHNICAL FIELD

This invention relates to network monitoring, and more particularly to status displays.

BACKGROUND

Network monitoring software aims to detect problems and potential problems with networked resources. The network monitoring software is therefore concerned with how problems can propagate from one resource to the next. The network monitoring software is also concerned with, for a given resource experiencing a problem and having several component resources, isolating the source of the problem to a given component or set of components. One term for this and related goals of network monitoring software is "root cause analysis." Root cause analysis seeks the origin of a problem, i.e., the first condition that caused a propagation of problems. The paths along which problems propagate can be represented as a dependency relationship between a first resource originating the problem and a second resource to which the problem propagates; the second resource is dependent upon the first not to cause problems. When two resources are involved this way, the dependency relationship is "binary". More complicated dependency relationships might not be binary but may involve three or more resources. Such relationships can usually be expressed by a set of binary dependency relationships.

Directed Trees

FIG. 9A shows a directed tree 39, a data model known in the computing art. Tree 39 includes nodes 391 and edges 396. Tree 39 includes exactly one node 391 designated as its root 392. Each edge 396 has a direction 394 and connects two distinct nodes 391. A "path" is a sequence of edges 396 such that each member edge 396 shares a node 391 with its neighbor edge 396.

Direction 394 labels one of the two nodes 391 as the "departure" and the other as the "destination" for a given edge 396. A directed path goes "from" the departure node 391 of the path's first edge 396 and "to" the destination node 391 of the path's last edge 396, with neighboring edges 396 in the directed path sharing the departure node 391 of one neighbor with the destination node 391 of the other. Directed tree 39 has direction 394 determined for each edge 396 by position relative to root 392—in particular, directed trees 39 for which all edges 396 "point toward" root 392, or for which all edges 396 "point away from" root 392. A more formal definition of "pointing toward" root 392 is that every edge 396 in tree 39 begins a directed path to root 392. Likewise, "pointing away from" root 392 may be defined as every edge 396 in tree 39 ends a directed path from root 392.

Known properties of trees 39 include: "connectedness", meaning every node 391 is connected to every other node 396 via some path in tree 39; and "path uniqueness", meaning that a minimal path in tree 39 between a first node 391 and a second node 396 is the only such path between those nodes 396. The path is minimal in terms of its length. The "length" of a path is the number of edges it contains.

The "depth" of each node 391 is the length of the (unique) path that connects node 391 to root 392. The node 391 designated as root 392 has depth zero; all other nodes 391 have non-zero integer depth.

There is another way besides "departure" and "destination" to describe the nodes 391 of an edge 396: the node 391 with the lesser depth is called the "parent" of the other node 391, while the node 391 with greater depth is called the "child" of the parent. If A is a node 391, B is a child node 391 of A, and C is a child node 391 of B, then C is called a "grandchild" of A. Nodes 391 with no children are called "leafs". The number of child nodes 391 of a node 391 is called the "degree" of that node 391.

Nodes 391 having the same depth are said to be on the same "level", also known as "tier". A tier is often specified by the number that characterizes the depth of its nodes 391. For example, "tier one" includes all nodes 391 that share edges 396 with root 392. At least two mathematical truths apply to edges 396 in tree 39 with regard to tiers (the proofs are known in the art). First, for "n" greater than zero, each tier "n" node 391 shares exactly one edge 396 with a node 391 in tier "n−1". Second, edges 396 always join nodes 391 from different tiers—specifically, tiers that differ in depth by exactly one. A corollary of the second truth is that edges 396 never join nodes 391 within the same tier. These truths can be summarized intuitively as follows: edges 396 in tree 39 always go "up and down" between adjacent tiers, never "sideways" (within a tier) or skipping a tier; and, all nodes 391, except for root node 392, have a parent.

A first node 391 together with all its child nodes 391, grandchild nodes 391, the child nodes 391 of the grandchild nodes 391, and so forth, together with their connecting edges 396 form subtree 395. The subtree 395 just described is itself a tree 39 having the first node 391 as root 392. Because subtrees 395 have the same structure and properties as trees 39, trees 39 are said to be "self-similar". Many recursive algorithms work well on trees 39 because trees 39 are self-similar, among other reasons.

The "distance" between two nodes 391 in tree 39 is the length of the shortest path connecting them. (Recall that because tree 39 is connected, at least one such path exists. Also, because tree 39 has path-uniqueness, there is precisely one such path.) Two nodes 391 sharing an edge 396 are connected "directly". Another way of saying this is that their path length is one. Two nodes 391 connected by a path of length greater than one are connected "indirectly", i.e. via intermediary nodes 391.

The direction from node 391 toward a node 391 of lesser depth is called up; toward greater depth is down. To "traverse" tree 39 means to point to its nodes 391 one after the other, where successive nodes 391 are only chosen if they are joined by edges 396.

Node 391 can data structures in addition to those necessary to participate in tree 39. Edge 396 encodes as a data structure that can contain additional data structures, in like manner. Therefore, certain attributes of the data structures for nodes 391 and edges 396 may pertain to entities not inherent to tree 39 itself—for instance, the data structures often contain attributes of the concept being modeled by tree 39.

To the degree that hierarchies have the structure of a tree, the same terms apply.

SUMMARY

In general, in one aspect, the invention features a computer-based method for displaying the status of networked resources, including rendering in a fishbone layout a hierarchy that includes a plurality of resource profiles and a plurality of dependency relationships among the resource profiles, where the resource profiles represent networked resources.

Preferred embodiments include one or more of the following. The method includes acquiring a status of a monitored resource that has a monitored resource profile in the fishbone layout, as well as updating the fishbone layout to reflect the status. Acquiring a status includes repeatedly acquiring the status at regular intervals. Acquiring the status includes acquiring information about properties of the monitored resource that have changed in the most recent interval. The monitored resource profile includes a propagation rule for how the acquired status should propagate to dependent resource profiles that are in consumer dependency relationships with the monitored resource profile, while updating the fishbone layout includes updating the rendering of the dependent resource profiles. The rendering first displays the fishbone layout in a display panel, using a first density mode of the fishbone layout, while the method further includes replacing the first density mode with a second density mode. The replacing is in response to a change in the ratio of members of the fishbone layout to a size of the display panel. The first density mode of the fishbone layout is a standard mode that renders a tier-two resource profile as a spine, and the second density mode a mode for rendering components of the fishbone layout at a higher density, relative to the first density mode. The first density mode of the fishbone layout is a mode for rendering components of the fishbone layout at a higher density, relative to the second density mode, and the second density mode a standard mode that renders a tier-two resource profile as a spine. An instance of topological connectivity between the renderings of two resource profiles in the fishbone layout corresponds to an immediate dependency relationship between the two resource profiles, while an absence of topological connectivity between the rendering of two resource profiles in the fishbone layout corresponds to an absence of any immediate dependency relationship between the resource profiles. The second density mode of the fishbone layout is a dense mode that renders a tier-two resource profile as a parallelogram.

The method includes presenting a summary dialog that describes a component of the fishbone layout in response to a sustained mouseover. The method includes displaying a context menu for a component of the fishbone layout in response to a right-click on the component, where the context menu includes a drill-down list offering procedures to invoke on the component. The context menu is customized to the component. A procedure in the drill-down list invokes in response to a selection by the user, a report in a network analysis tool. A procedure in the drill-down list causes re-rendering of the fishbone layout in response to a selection by the user, such that the component becomes the root of the fishbone layout. A procedure in the drill-down list opens in response to a selection by the user, a new display panel having a fishbone layout. The fishbone layout has a root and uses the component as the root. A procedure in the drill-down list opens, in response to a selection by the user, a new snowflake display having a root and using the component as the root.

In another aspect, the invention features a computer-based method for displaying the status of networked resources. The method includes providing a hierarchy, which includes a root resource profile and dependent resource profiles in dependency relationships with the root resource profile. A minimal path from each dependent resource profile to the root resource profile, including a sequence of dependency relationships, has a path length corresponding to a tier in the hierarchy for each such dependent resource profile. The resource profiles represent networked resources. The method also includes acquiring a status of a monitored resource profile, which is either the root resource profile or among the dependent resource profiles; associating the status with a severity; and rendering the hierarchy in a fishbone layout. The monitored resource profile is rendered with a visual trait indicating the severity.

Preferred embodiments include one or more of the following. The visual trait includes a color selected from a plurality of colors representing a severity scale. The associating the status with a severity includes using a status metric associated with the monitored resource profile. The method include acquiring notice of a change in the status, updating the severity; and re-rendering the hierarchy in a fishbone layout, to include rendering the monitored resource profile to indicate the updated severity. The severity includes applying an application-wide override to deviate from a behavior indicated by the status metric. The deviation includes suppressing a change in severity. The fishbone layout is included in a snowflake layout.

In still another aspect, the invention features a computer-based method for displaying the status of networked resources. The method includes acquiring a logical hierarchy that includes resource profiles, as well as dependency relationships among the resource profiles. The resource profiles represent networked resources. The method also includes deriving a visual hierarchy from the logical hierarchy, where components of the visual hierarchy correspond to components of the logical hierarchy, such that the visual hierarchy is a tree. The method includes rendering the visual hierarchy in a fishbone layout.

Preferred embodiments include one or more of the following. The visual hierarchy is a directed tree. The fishbone layout is included in a snowflake layout.

In yet another aspect, the invention features a computing apparatus for displaying the status of networked resources. The apparatus includes a computer usable medium having computer readable program code means embodied in it, including a processor, a main memory, a visual display, a storage device, and a network connection. The program code means includes computer readable program code means for causing a computer to represent a hierarchy including resource profiles and dependency relationships among the resource profiles. The resource profiles represent networked resources. The apparatus also includes computer readable program code means for causing the computer to acquire a status of a monitored resource profile among the resource profiles. The apparatus includes computer readable program code means for causing the computer to render the hierarchy in a fishbone layout, including rendering a visual representation of the status of the monitored resource profile.

In another aspect still, the invention features a computer-based method for displaying the status of networked resources, including rendering fishbone layouts in a snowflake layout. The fishbone layouts each feature a hierarchy with resource profiles and dependency relationships among the resource profiles, where the resource profiles represent networked resources. Each hierarchy shares a common root. Preferred embodiments with regards to one or more fishbone layouts in the snowflake layout include one or more of the features already described with regards to a fishbone layout.

In yet still another aspect, the invention features a computing apparatus for displaying the status of networked resources. The apparatus includes a computer usable medium having computer readable program code means embodied in it, including a processor, a main memory, a visual display, a storage device, and a network connection. The program code means includes computer readable program code means for causing a computer to render fishbone layouts in a snowflake layout. Each fishbone layout features a hierarchy with resource profiles and dependency relationships among the resource profiles. The resource profiles represent networked resources. Each hierarchy shares a common root Advantages of the present invention include the following.

Root cause analysis is a useful application for dependency relationships. System planning also benefits from knowledge of dependency relationships, so that the impact of a change can be anticipated.

As the number of monitored resources grows, an unorganized web of interrelated resources can become difficult for a user to understand. An advantage of the present invention is that if a logical hierarchy is imposed on the web, relative to a root resource, the logical hierarchy is rendered as a visual hierarchy, according to a layout such as a fishbone or a snowflake. An organized presentation of the visual hierarchy, such as occurs in a fishbone or snowflake, makes the meaning of status changes (for instance, the impact of a problem) in the web easily apparent visually, even if the meaning was not easily apparent conceptually before the visual rendering. For instance, viewing the web of resources from the perspective of the root resource can offer insight into the role of the root resource within the web. It often illuminates the role of other resources as well: for instance, if they play intermediary roles in extended relationships. When the relationships are dependency relationships, a hierarchy can represent all of the resources that a root resource depends on, both directly (at the level of the hierarchy immediately below the root) and indirectly (transitively, in subsequent levels of the hierarchy).

Another advantage of the present invention is that multiple logical hierarchies may be defined over the same set of resources, offering a variety of perspectives. Furthermore, the logical hierarchies may be tailored to various user profiles, so that (for instance) some users may be given a high-level view, while users who have responsibility for a narrower subset of the resources may use views that focus exclusively on those users' interests.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 3B shows GUI elements and techniques from the prior art.

FIG. 9A shows a prior art directed-tree data model.

FIG. 9B illustrates structure in a logical hierarchy.

Like reference symbols in the various drawings indicate like elements.

DETAILED DESCRIPTION

In the described embodiment, an interactive display shows status information for resources monitored by network monitoring software. A hierarchical status display process arranges the resources for display in a visual hierarchy. The visual hierarchy derives from a logical hierarchy containing resources in dependency relationships with one another. The logical hierarchy is a data model, while the visual hierarchy is a graphical representation of a logical hierarchy. The visual hierarchy includes "fishbone" and "snowflake" layouts. The snowflake layout includes two fishbone layouts. A fishbone layout displays a logical hierarchy as a stylized tree in a plane. The fishbone layout, at a moment in time, shares some visual attributes with an Ishikawa diagram. As will be explained in more detail, however, the fishbone layout differs from Ishikawa diagrams in that a fishbone layout can vary over time as it is dynamically updated and is interactive with a user, among other differences. Also, a fishbone layout can be moved between display modes when its associated logical hierarchy contains too many members for the fishbone layout to represent in a given display area.

The hierarchical status display process can change the visual hierarchy in response to a change in the status of a resource monitored by network monitoring software. The hierarchical status display process renders the visual hierarchy in a display window. A user can interact with the display window to get more information about a resource, including a menu of options tailored to each resource. The options include analysis tools that the user can launch to examine a resource in detail. The analysis tools are external to the application that renders the display. In general, the visual hierarchy displays information at a summary level, while interactive options allow a user to get information at a detail level.

The resources are entities monitored by network management software. Resources include hardware, applications, services, business processes, organizational structures (such as business units within an enterprise, or departments within a university), paths within a network, and other network resources. Hardware resources include clients, servers, routers, switches, and NIC's, as well as peripheral devices (such as disk drives) and networked devices (such as printers and networked storage). Both individual network resources and collections of such resources can be resources. For resources that include collections of resources, the resources may be distributed or heterogeneous or both. The collections may include other collections.

Figure 1A:
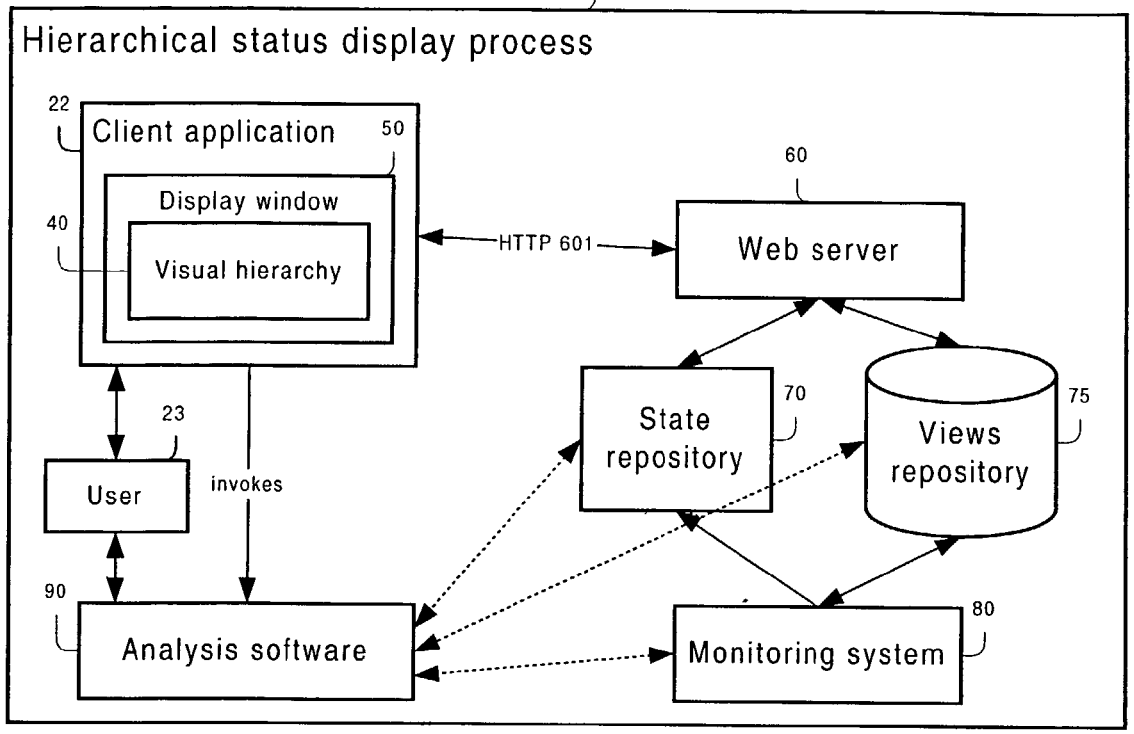
FIG. 1A is a block diagram of a system for interactive hierarchical status display.

FIG. 1A shows a hierarchical status display process 20 including a client application 22 that accesses a web server 60 via an HTTP interface 601. Client application 22 retrieves information about a logical hierarchy 30 stored in a views repository 75. Client application 22 uses a hierarchy representation 40 to render logical hierarchy 30 graphically in a display window 50 to a user 23.

Client application 22 polls web server 60 for information from a state repository 70 and views repository 75. State repository 70 is maintained by a monitoring system 80, which collects information about the states of resources and places it in repository 70.

Display window 50 is interactive, i.e., responsive to input from user 23. Display window 50 allows user 23 to apply analysis tools 90 to resources described in logical hierarchy 30.

Computing Platform

Figure 1B:
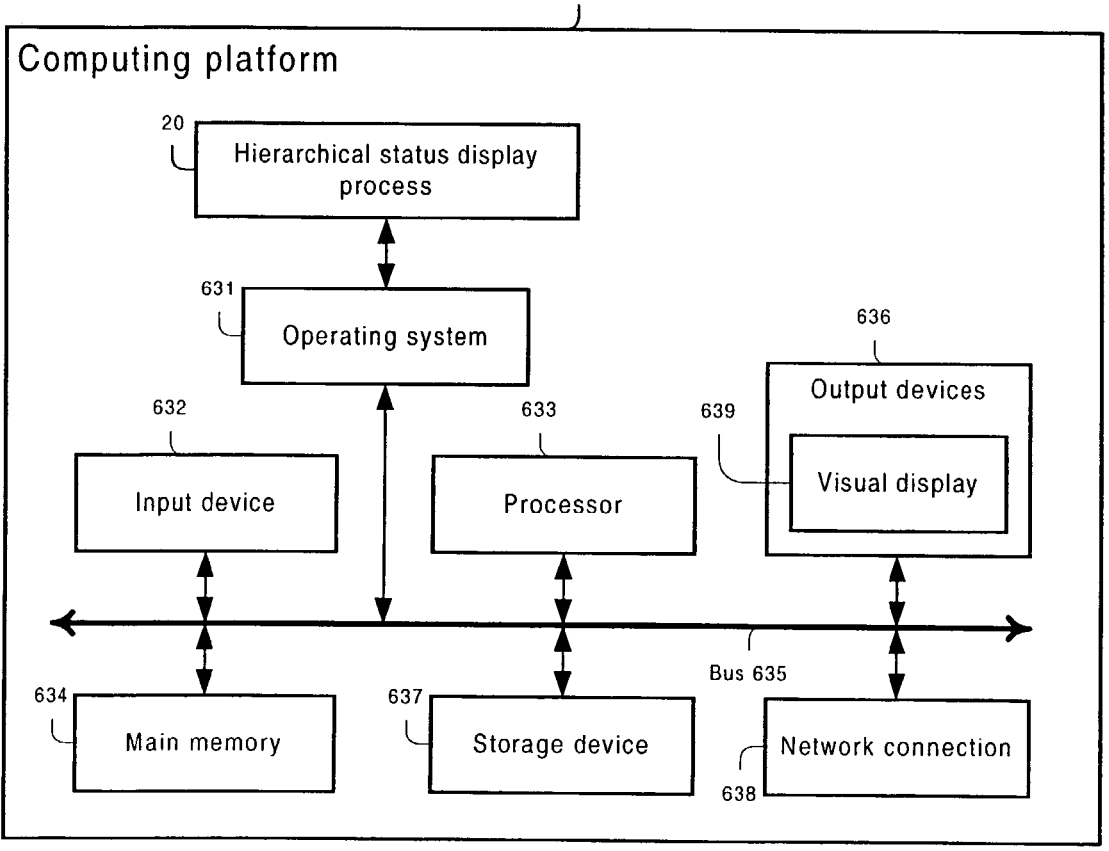
FIG. 1B is a block diagram of a computing platform.

Referring to FIG. 1B, hierarchical status display process 20 contains computer instructions and runs on an operating system 631 on a computing platform 63. For simplicity, FIG. 1B shows hierarchical status display process 20 interacting with one operating system 631 and related hardware, when in fact component processes of hierarchical status display process 20 may be distributed over multiple computing platforms 63 interconnected by network connections 638.

Operating system 631 is a set of computer instructions resident in either a main memory 634 or a non-volatile storage device 637 or both. A processor 633 can access main memory 634 and non-volatile storage device 637 to execute the computer instructions for operating system 631 and hierarchical status display process 20.

User 23 interacts with the computing platform via one or more input devices 632 and one or more output devices 636 including a visual display 639. Possible input devices 632 include a keyboard, a microphone, a touch-sensitive screen, and a pointing device such as a mouse. Possible output devices 636 in addition to visual display 639 include a speaker and a printer. Usually, visual display 639 can display variations of color (i.e., is not a monochrome display).

Non-volatile storage device 637 includes a computer-writable and computer-readable medium, such as a disk drive. A bus 635 interconnects the processor 633, input device 632, output device 636, storage device 637, main memory 634, and optional network connection 638. Network connection 638 includes a device and software driver to provide network functionality, such as an Ethernet card configured to run TCP/IP, for example.

Client application 22 is written in the Java programming language. Some components of client application 22 may be written in other languages such as C++, compiled into lower-level code (such as machine code), and incorporated into the main body of software code via component interoperability standards. In the Microsoft Windows computing platform, for example, component interoperability standards include COM (Common Object Model) and OLE (Object Linking and Embedding).

Monitoring System and Resources

Figure 4A:
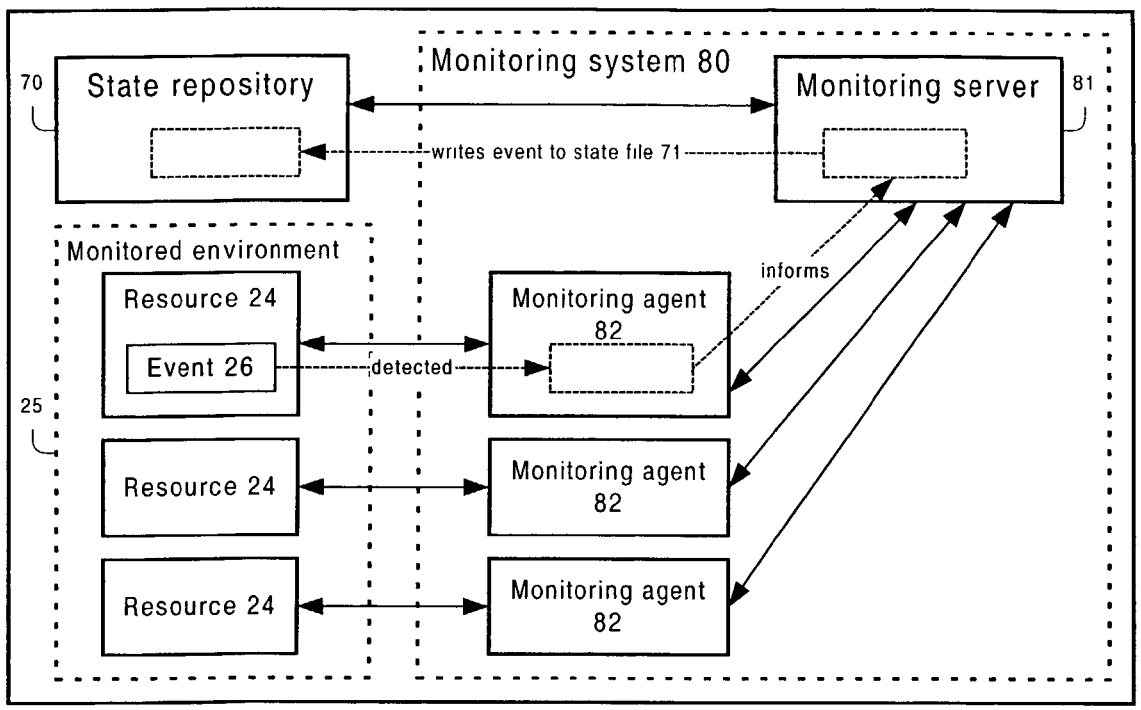
FIG. 4A shows a monitoring system from the prior art.

Referring to FIG. 4A, monitoring system 80 monitors resources 24 in a monitored environment 25. The configuration of monitoring system 80, including decisions about which resources 24 to monitor, are beyond the scope of the invention and will not be detailed here. Monitoring system 80 includes network-monitoring software. A commercial product that is an example of monitoring system 80 is LiveExceptions, sold by Concord Communications, Inc., of Marlboro, Mass., USA.

Conceptually, resource 24 is a placeholder for a wide range of things: usually, it performs a function related to networking in monitored environment 25 or is involved in a dependency relationship 78 with another resource 24. The function itself need not be directly related to networking: for instance, a disk drive in a server may be consider a networked resource 24, by virtue of the server's networked role. Another way of defining resource 24 is in terms of how it is used within hierarchical status display process 20: resource 24 is anything monitored by monitoring system 80. For example, resource 24 can represent a single physical unit to be monitored, such as a personal computer, server, router, switch, link, L3 route, or a response path. However, resource 24 need not be atomic: it can represent a group of resources 24, groups within a group, and so forth. Resource 24 can be a concept: for instance, a business process, or an organizational unit such as a department or project. Resource 24 can also be a logical construct such as a level-three network route. Importantly, resource 24 can also be software, such as an application or service. Resource 24 can be distributed or localized to one computer.

Properties of resource 24 include a name, a role within a system or domain, and properties appropriate to its context. Each property of resource 24 has a current state. A resource also has at least one status, which, at a given point in time, has a single value derived from the current states. The range of values for resource 24 status usually includes values for trouble-free, warning, and error.

For example, there might be a resource named "east campus router". It has a role of being a router within a network. It has properties appropriate to being a router: for instance, system components such as a CPU, two network interfaces, and at least one IP address (assuming the network uses the IP protocol). The network interfaces may have operational states including "ideal", "congested", and "failed".

Figure 4B:
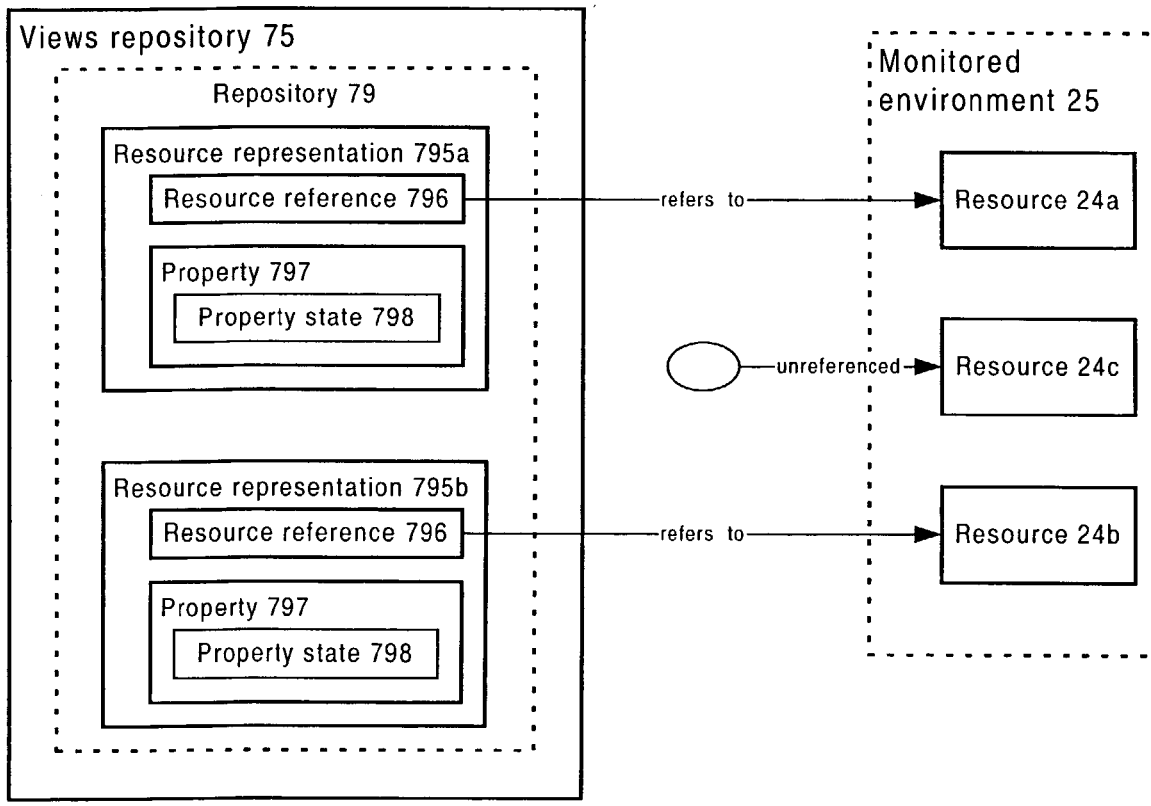
FIG. 4B is a block diagram of a views repository.

Referring to FIG. 4B, resource 24 is represented in views repository 75 by a resource representation 795. Resource representation 795 is a software object that refers to resource 24 and abstracts properties of resource 24 for manipulation in a computing environment. The correlation between resource representation 795 and its resource 24, therefore, is conceptually very tight.

A resource reference 796 describes resource 24. A property 797 of resource representation 795 represents a property on the corresponding resource 24. Property 797 has a property state 798. Note that monitored environment 25 may contain, as shown in FIG. 4B, resource 24c not referenced by any resource reference 796. However, every resource reference 796 describes some resource 24.

Resource Profiles

A given resource 24 may play a variety of roles in monitored environment 25. For instance, a given server can support multiple applications and services. Sometimes a problem for resource 24 in one role is not a problem for that same resource 24 in another of its roles. For instance, a router experiencing a certain level of congestion may cause a problem in a "realtime" context, such as for an application like videoconferencing that depends on router to provide network service supporting realtime traffic. At the same time, in an "email" context, an email application may depend on the same router, but may have a much higher threshold before a congestion level would create a problem.

In general, a resource profile 77 offers a way of representing resource 24 in a context. A given resource 24 may therefore be represented in more than one context.

Figure 5A:
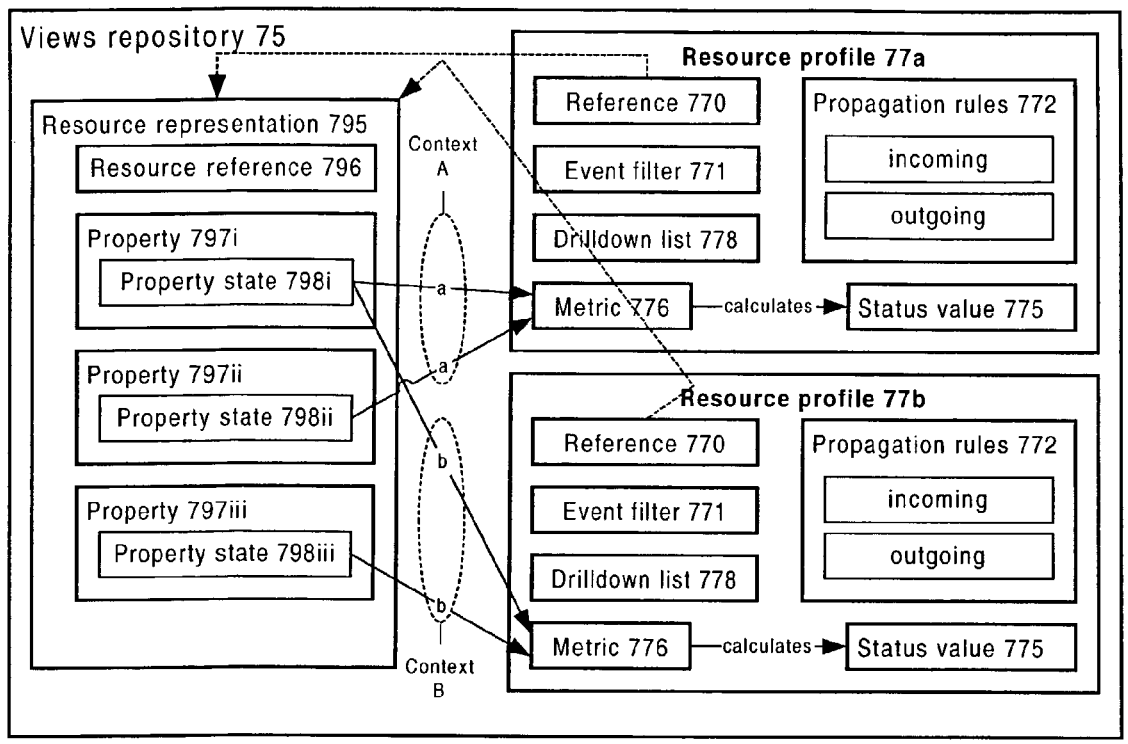
FIG. 5A illustrates representing one resource in multiple contexts via profiles.

Referring to FIG. 5A, resource profile 77 pairs resource representation 795 with a status value 775. This pairing is encoded by a reference 770. Status value 775 derives from states 798 of the associated resource representation 795; the derivation is given by a status metric 776. Since status metric 776 determines the states that status value 775 represents and how their values are weighed, status metric 776 can represent a context through its choice of states 798 and through the outputs that it assigns. For instance, in FIG. 5A, resource profiles 77a and 77b represent two different contexts ("Context A" and "Context B", respectively) for one resource representation 795. Also note that distinct profiles 77 can draw on the same state 798 for use by status metric 776. In the example shown, resource profile 77a draws on states 798i and 798ii, while resource profile 77b draws on states 798i and 798iii, i.e., state 798i is common to both.

Resource profile 77 can ignore categories of exceptions that would otherwise affect its status value 775 by encoding criteria for these categories in an event filter 771.

Resource profile 77 can specify a drilldown list 778 of analysis functions 799 exposed by an analysis tool 90. Drilldown list 778 will be presented to user 23 during certain interactions with a rendering of resource profile 77 in visual hierarchy 40. (See the section "Fishbone interactivity".) Drilldown list 778 provides a way of tailoring the analysis methods available to user 23 to each resource profile 77.

A commercial product that offers resource profiles 77 is NetworkHealth, sold by Concord Communications, Inc., of Marlboro, Mass., USA.

Dependency Relationships

Figure 5B:
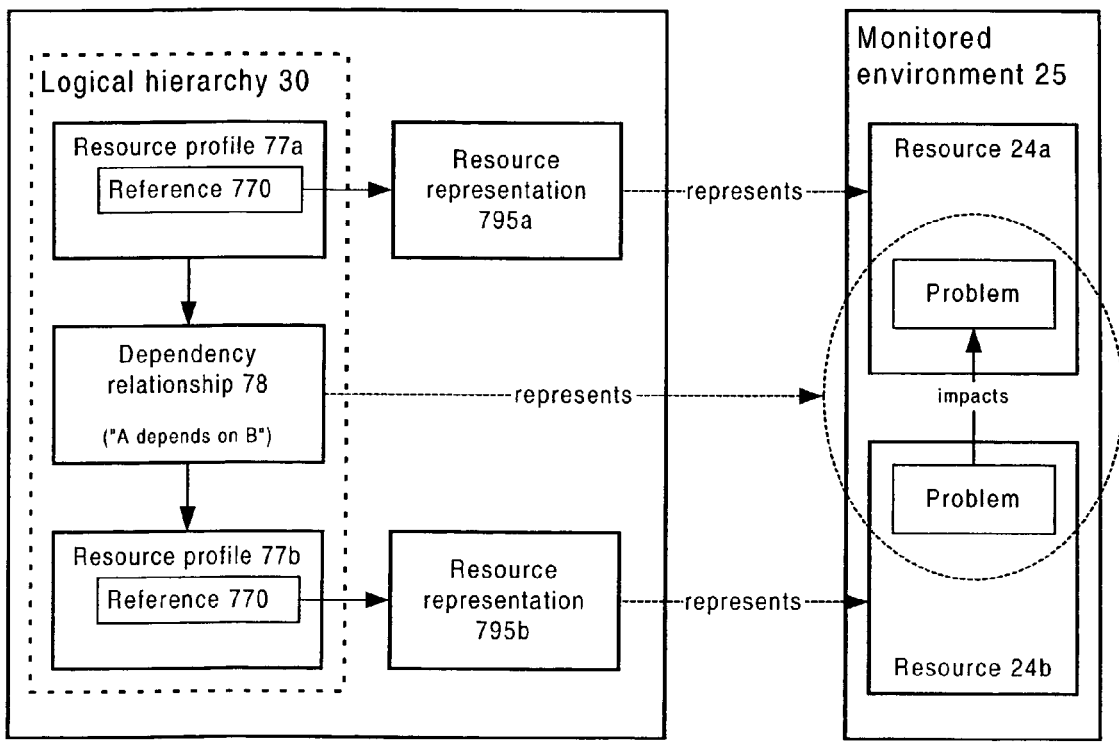
FIG. 5B illustrates a logical hierarchy representing resources.

Referring to FIG. 5B, dependency relationship 78 represents a condition by which events in one resource 24 (in this example, resource 24b) can influence the status of another resource 24a. Specifically, resource 24b is represented by resource representation 795b, which is referenced by resource profile 77b. Likewise, resource 24a is represented by resource representation 795a, which is referenced by resource profile 77a. Note the following use of terms. The "direction" of the consumer dependency relationship 78 is the opposite of the direction in which problems propagate: resource profile 77a "depends on" or "is a consumer of" resource profile 77b, while problems in resource 24b propagate toward (or impact) resource 24a. From the other end's perspective on dependency relationship 78, that is, for a provider dependency relationship 78 where resource profile 77b "is a provider to" resource profile 77a, the direction of dependency relationship 78 coincides with the direction in which problems propagate.

Recall that resource profile 77 represents resource 24 in light of a context. Dependency relationship 78 incorporates context by referencing resource profiles 77 rather than resource entities 795.

The number of resource profiles 77 involved in a given dependency relationship 78 is called the "degree" of dependency relationship 78. A relationship that involves just two resource profiles is called "binary". FIG. 5B shows an example binary dependency relationship 78. Note that dependency relationships 78 of degree higher than two can be represented by a set of binary dependency relationships 78, as follows. Choose a context that describes the degree-n relationship, make resource profile 77 for each resource 24 involved in that context, and add a binary dependency relationship 78 between each pair of resource profiles 77 to describe the interaction of the two resources 24.

Consumer relationships and provider relationships are common in real world applications. They can model many relationships that one would intuitively describe with the phrases "includes in" or "depends on". "Depends on" is obviously appropriate to dependency relationships 78. "Includes in", too, is often a good fit for dependency relationships 78 since a problem in a component often can propagate to the whole. For instance, if a server S depends on three hard drives C, D, and E, we can create resource profiles 77 for S, C, D, and E and three dependency relationships 78: from S to C, D, and E, respectively. Likewise, if the accounting department A depends on two servers S and T, we can create additional resource profiles 77 for A and T along with two dependency relationships 78: from A to S and T, respectively. Situations in which one resource 24 incorporates or aggregates several other resources 24, while also depending on them, are quite important to users of network monitoring software.

An example of a non-binary dependency relationship 78 is a component of a distributed transaction or service involving three or more resources 24.

Logical Hierarchy

Figure 8:
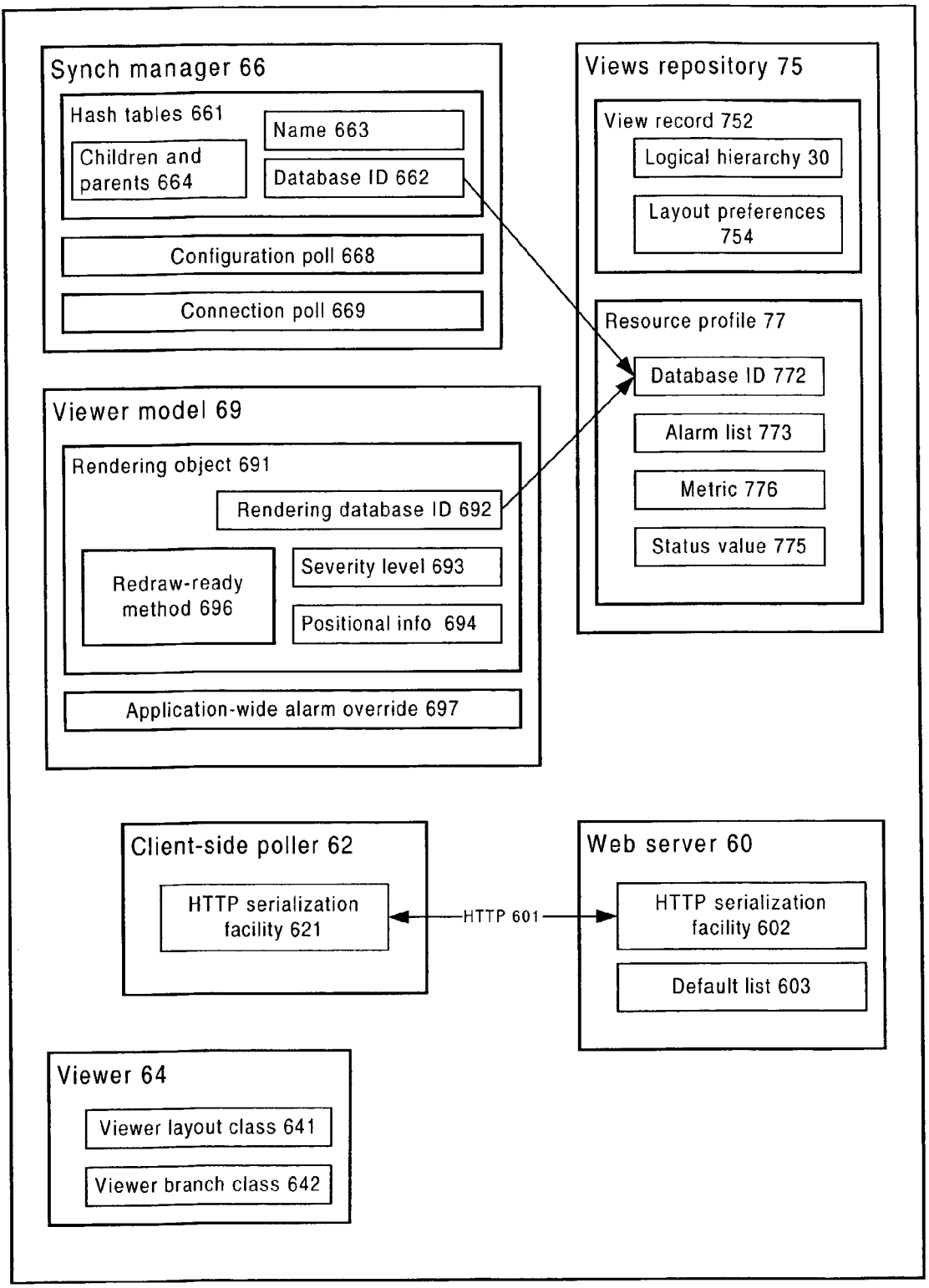
FIG. 8 is a block diagram of classes in a client application.

Logical hierarchy 30 offers a tree-based data model describing a web of dependency relationships 78 between resource profiles 77. Views repository 75 stores each logical hierarchy 30 in view record 752, as shown in FIG. 8. Views repository 75 provides a central location from which more than one client application 22 can access the same logical hierarchy 30 simultaneously.

Logical Hierarchy Meaning

Broadly speaking, logical hierarchy 30 is a flexible structure (as will be described in more detail) for collecting resource profiles 77 and their relevant dependency relationships 78 under one or more conceptual frameworks. Because its flexibility allows a wide variety of designs, logical hierarchy 30 is susceptible to bad design. For instance, user 23 may perceive less meaning in an alphabetical organizing scheme than in an organizing scheme based on functional analysis. More subtly, a first user 23 may perceive less meaning in a functional analysis based on business processes than in a functional analysis based on network hardware. And, a second user 23 may disagree, perhaps because the second user 23 has a different role or objective within monitored environment 25 than the first user 23. Techniques for shaping the meaning of logical hierarchy 30 to the requirements of users 23, including the choice of resource profiles 77 and dependency relationships 78 to include in logical hierarchy 30, are beyond the scope of the invention. Instead, this description assumes views repository 75 has been configured to contain logical hierarchies 30 useful to user 23.

Logical hierarchy 30 often models some single aspect of monitored environment 25 for consideration by user 23. Multiple logical hierarchies 30 can therefore be necessary to model all aspects of monitored environment 25. Also, multiple logical hierarchies 30 can be provided to suit different users 23.

Tree Basis

Logical hierarchy 30 draws on the prior art data model shown in FIG. 9A to represent elements shown in FIG. 9B in a tree-based structure. Each resource profile 77 corresponds to one node 391, while each dependency relationship 78 corresponds to one edge 396, such that edge 396 connects two nodes 391 only if its corresponding dependency relationship 78 connects the corresponding resource profiles 77. Root node 392 is associated with one resource profile 77 at the "top" or "center" of the meaning represented by logical hierarchy 30. Levels of logical hierarchy 30 correspond to tiers in tree 39.

For example, by using its tree-based data model, logical hierarchy 30 can organize information into tiers, with parent-child relationships between entities of adjacent tiers. The parent-child relationships are based on dependency relationships 78: for instance, parent resource profiles 77 can be dependent upon child resource profiles 77, as with a corporation that depends upon business units, each of which depend upon data centers. Alternatively, parent resource profiles 77 can provide to multiple child resource profiles 77, as with a server that provides multiple networked services, while each of the networked services (for instance, DNS, file sharing, and network security) provides its features to multiple software applications.

Recall from FIG. 9A that directed tree 39 has a path-uniqueness property. Uniqueness of path need not exist in the modeled world, i.e., monitored environment 25. For instance, resource profiles 77 A, B, and C may be interrelated such that A relates to B, B to C, and C to A. In this case, the path from A to B may be either direct or via C. This would violate the path-uniqueness requirement of directed tree 39. To deal with this, one can introduce a new resource profile 77 A' as a duplicate of A, then use A' to replace A in its direct relationship with C. A' is a resource profile having the same resource as A, but with a context especially for C. The relationship that formerly joined C to A now joins C to A'. Thus, after the introduction of A', all paths on A, B, C, and A' are unique. One can apply this approach in general to eliminate any multiple in the graph.

In general, a given resource 24 may be represented in multiple places in logical hierarchy 30, via multiple resource profiles 77, each having its own context. Furthermore, the status of resource 24 may differ between the multiple resource profiles 77, since each status is dependent upon the context represented by resource profile 77. For instance, suppose a router supports traffic for two customers of a service provider, and that customer A has contracted for higher quality-of-service (QOS) than customer B. The router is a resource 24 that will be modeled by two resource profiles 77, one for A and one for B. Certain congestion levels on the router may endanger the QOS of A without endangering B's lesser standard. Therefore, the resource profile 77 corresponding to the router in the context of customer A might be in a warning severity, even while the same resource 24 in another context (namely, B's context) would have a trouble-free severity.

Hierarchy of Dependant Profiles

FIG. 9B shows logical hierarchy 30 including a resource profile 77 designated as the root profile 32. For simplicity of explanation, this description and FIG. 9B use example hierarchies having three levels, though more levels are possible. The example hierarchies are aggregation hierarchies, meaning that parents are collectives that aggregate their children. When using this three-level approach, the root is called the "group list", level one contains "groups", and level two contains "elements". In FIG. 9B, root profile 32 represents the group list, group profile 33 represents a group, and element profile 34 represents an element on level two.

Example Sources of Logical Hiearchies

Note that several analysis techniques produce tree-based data models to model an environment such as monitored environment 25. Logical hierarchy 30 supports such techniques via its tree-based data model. Examples include top-down analysis and bottom-up analysis: for instance, a top-down analysis could investigate how status changes propagate toward a given resource profile 35, while a bottom-up analysis could investigate how status changes escalate from localized situations to wider scope. The particular analysis techniques to apply to monitored environment 25, as well as the details of such techniques, are beyond the scope of the present invention. As a broad example, though, logical hierarchy 30 can support a model hierarchy produced by a top-down analysis of monitored environment 25 from the perspective of a single resource 24, as follows. Given resource 24, designate a corresponding resource profile 77 as root profile 32. Use top-down analysis of monitored environment 25 to identify one or more resource profiles 77 that root profile 32 depends upon; designate these resource profiles 77 as group profiles 33 joined to root profile 32 by binary dependency relationships 78. Repeat recursively to populate successive levels of logical hierarchy 30 tree.

Alarms

Monitoring system 80 associates alarm 35 with resource profile 77. More specifically, as shown in FIG. 4A using dotted arrows, monitoring agent 82 detects event 26 for resource 24. Event 26 can be a change in the state of one or more properties of resource 24. Monitoring agent 82 informs monitoring server 81 of event 26. Monitoring server 81 consults views repository 75 (not shown in FIG. 4A; see FIG. 8) to find one or more resource profiles 77 representing resource 24. Resource profile 77 (as shown in FIG. 5A) contains event filter 771 which may instruct monitoring server 81 to ignore event 26; otherwise, monitoring server 81 can invoke the resource profile's 77 metric 776 to evaluate status value 775. Monitoring system 80 is configured such that certain settings of evaluated status value 775 cause monitoring system 80 to create alarm 35 for resource profile 77. In other words, certain designated settings of status value 775 have severity sufficient to create alarms 35. Monitoring system 80 writes each alarm 35 to state file 71 corresponding to resource profile 77 that evaluated event 26. Note that one event 26 may cause alarm 35 on more than one resource profile 77. One event 26 may also cause more than one alarm 35 on a given resource profile 77: for instance, a first alarm 35 may be designated to propagate differently than a second alarm 35.

Alarm 35 includes a severity 351, a grade 352 (which groups severity levels into broader categories such as failure versus warning), a text description 353, and an active/inactive flag 354.

Display

The next sections describe components and techniques of the visual display of logical hierarchies 30.

Display Window

Display window 50 is presented to user 23 on output device 636 (shown in FIG. 1B), usually visual display 639 such as a CRT monitor or flat-panel display. FIG. 3B shows that display window 50 contains certain GUI objects and techniques known in the art, including title bar 511 arranged along the top edge of display window 50, menu bar 512 arranged immediately beneath title bar 511, status bar 513 arranged along the bottom edge of display window 50, and display panel 515 which occupies the remainder of display window 50.

Title bar 511 contains text identifying client application 22 as the owner of display window 50 among the (possibly several) applications running on operating system 631 (shown in FIG. 1B). Title bar 511 provides other functions specific to operating system 631. Usually the functions include the ability to relocate, resize, request the close of, or restore the size of, display window 50.

Menu bar 512 is responsive to keystrokes and mouse actions by user 23 to select dropdown items 519 on a dropdown menu 518 on menu bar 512. Dropdown items 519 of a menu 518 are hidden until user 23 interacts with the menu 518. Usually some of the menus 518 and dropdown items 519 are dictated by a GUI standard of operating system 631. For instance, a "File" menu 518 (shown in FIG. 6B) usually contains dropdown items 519 for opening and closing application files, as well as quitting client application 22.

A second sort of menu, context menu 514, is also hidden until user 23 positions the mouse pointer 51 over display panel 515 and right-clicks or performs some other designated action via input device 632. (For instance, in Microsoft Windows there can be a dedicated key on the keyboard for the purpose of raising context menus 514.) In this discussion, "right-click" shall refer to this action generically. The right-click causes context menu 514 to appear near the location of the mouse pointer 51. Similar to a dropdown menu 518, context menu 514 contains a list of drilldown items 516 for the user to select. The context menu 514, however, is usually tailored to the current state of the application and to the location of the mouse pointer: hence the term "context". Particularly, if the mouse pointer 51 is located over a rendering of resource 24, the drilldown items 516 may be tailored to the identity of that resource 24 or resource profile 77 and its current state.

In some operating systems 631, for instance Microsoft Windows, menu bar 512 or status bar 513, or both, may be expandable, customizable, or hideable altogether. User interfaces employing title bars 511, menu bars 512, status bars 513, central display panels 515, and context menus 514 are known in the art. Such user interface elements, per se, are not central to this invention (although their specific content and the techniques that provide it, including the content of dropdown items 519 in menu bars 512 and drilldown items 516 in context menus 514, are central to the invention), so those GUI techniques will not be further explained here.

Fishbone

One form of hierarchical status display is fishbone layout 45 (FIG. 2A), which displays logical hierarchy 30 as a stylized tree in a plane. Another form of hierarchical status display is snowflake 46, as will be explained later. Fishbone layout 45 is so named because it is evocative of the backbone of a fish. Fishbone layout 45, at a moment in time, shares some visual attributes with an Ishikawa diagram, which is a layout in the field of manufacturing quality control. Fishbone layout 45, however, can be dynamically updated and is interactive, among other differences from Ishikawa diagrams.

Fishbone layout 45 shows a tree having root icon/label 421, which is associated with root profile 32 in logical hierarchy 30. Fishbone layout 45 also features root line 422 running substantially the length of fishbone layout 45. Usually, root line 422 approximately divides fishbone layout 45 into halves.

In general, the rendering of each resource profile 77 includes a line anchored by a label or icon, or both (or perhaps none if the rendering engine is constrained for space, as will be explained later). The term "icon/label" refers to this possible icon or label or pair.

A resource profile 77 in a direct dependency relationship 78 with the root resource profile 77 is a group; each group has its own icon/label 424, together with its own line 423 connecting the group icon/label 424 to root line 422. A group line 423 (and in general the line of any non-root resource profile 77) is referred to as a "spine". In general, for a level "n" resource profile 77 directly related to a level "n−1" resource profile 77, the level "n" resource displays as an icon/label and a line connecting the icon/label to the line for level "n−1", producing a fanned-out tree. Spines can have arrowheads at one end to indicate directionality from or toward root profile 32 with regard to dependency relationships 78. The direction on a spine usually indicates a "provider" direction of dependency relationship 78, though legend 427 may override that.

Figure 2A:
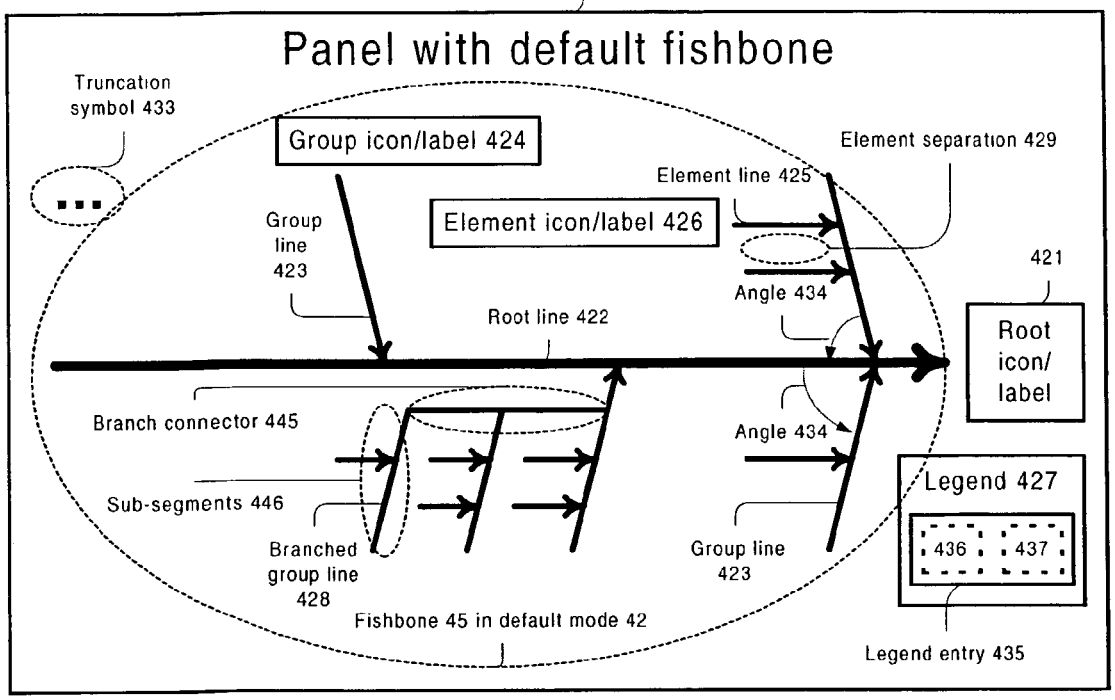
FIG. 2A illustrates a display panel including a fishbone display in default mode.

The spines that connect directly to root line 422 are angled relative to the root line by an angle 434, usually (but not exclusively) in the range of 70–80 degrees. These spines to either side of root line 422 share substantially the same angle 434 relative to root line 422, as shown in FIG. 2A. Thus, all sloped spines on a given side of root line 422 are substantially mutually parallel.

A recursive similarity renders subsequent levels of visual hierarchy 40: spines that connect directly to the sloped spines are parallel to root line 422, spines that connect directly to spines parallel to root line 422 are sloped, and so forth. Thus, all spines fall into three categories, members of each category being substantially mutually parallel. One category is for spines parallel to root line 422 (representing resource profiles 77 which are an even number of hierarchy levels removed from the root profile 77). We shall call this the "even" group, since they correspond to resource profiles 77 in even-numbered levels of logical hierarchy 30. (For these purposes, zero—the number of the root level—is considered an even number.) A second category contains spines not in the even group and rendered above root line 422 in display panel 515; we shall call this the "upper" group. Spines in the upper group are either directly connected to the main line 422 (and thus at level one) or are an even number of hierarchy levels removed from such spines (and thus at an odd-numbered level). A third category includes spines not in the first two groups and rendered on the other side of root line 422 from the upper group; we shall call this the "lower" group. As with the upper group, spines in the lower group are either directly connected to root line 422 or are an even number of hierarchy levels removed from such spines.

Note that if root line 422 is vertical, and since no other spine is collinear with root line 422, no spine is above it. In this case, the upper group can be the non-even spines to the right of root line 422. As before, the lower group collects the uncollected spines on the other side of root line 422 from the upper group.

User testing indicates that the fishbone alignment scheme is a visually "clean" way of rendering logical hierarchy 30 as visual hierarchy 40. Users 23 can generally perceive the approximate level of resource profile 77 within logical hierarchy 30 easily, especially when there are just three levels on display.

Modes

Fishbone layout 45 may be displayed in multiple modes. In this embodiment, the modes include a default mode 42 (shown in FIG. 2A) and a high-density mode 43 (shown in FIG. 2B). High-density mode 43 handles situations in which the number of elements to be displayed is too high for the default mode 42 to handle effectively with the current size of display panel 515. The crossover point between modes varies, since it depends on the number of elements in the display, the degree (number of children) of the nodes, the size and resolution of the current display panel 515, and possibly the rate of change of the membership of the hierarchy (since users 23 may consider it undesirable to see the display rearrange more frequently than a certain period), among other factors. For instance, the crossover point further depends on the density achievable in each mode, which depends on such choices as font and icon size as well as other choices to accommodate properties of the display device itself, such as poor contrast or low resolution. Broadly generalizing, though, a 1024 pixel by 768 pixel window can usually yield a crossover point of around 700 to 1000 fishbone components.

Both the default mode 42 and high-density mode 43 share most objects and behaviors. The visual conventions (such as layout, display behavior, coloring schemes, and so forth) can be different within each mode. In particular, high-density mode 43 usually represents an element resource profile 77 differently than the default mode 42 does. The default mode 42 (shown in FIG. 2A) usually uses element icon/labels 426, element lines 425, and a region for element separation 429. Element separation 429 allows the background of display panel 515 to be perceived between one element rendering and its neighbor. High-density mode 43 (shown in FIG. 2B), however, represents an element resource profile 77 with a dense parallelogram 430 having one side touching the group line 423 and possibly having other sides touching neighboring dense parallelograms 430. Neighboring dense parallelograms 430 can be visually differentiated from one another by a variety of graphical techniques, such as alternating luminescence, but as density increases (and the parallelograms 430 necessarily become smaller) it becomes hard for human vision to distinguish between contrasts (in color, luminescence, texture, etc.) over small areas, especially given the limited resolution of most visual displays 639. Mouseover techniques (as will be explained) can be used to allow user 23 to distinguish tightly packed parallelograms 430.

Spines in fishbone layout 45 are layered at least two layers deep (i.e. group line 422 and a group line 423) and usually three layers deep. There is no upper limit inherent within the technique, though there are practical limits for a given visual display device 639 due to finite size and resolution. Also, there can be limits to the amount of information the typical user can easily comprehend visually. Preliminary user testing indicates that most users are comfortable with the information presented by a three-tiered hierarchy at with a visual display device 639 capable of 1024 pixels by 768 pixels.

Fishbone layout 45 also features a legend 427 having a legend entry 435. A legend entry 435 includes a legend graphic 436 and a legend explanation 437. The legend graphic 436 is a graphic exemplifying a graphical convention used in fishbone layout 45. The legend explanation 437 contains text that explains the intended meaning of the graphical convention.

Fishbone Visual Conventions

This section describes some of the conventions that affect the visual appearance of fishbone layout 45. Other conventions are described elsewhere, including those relevant to layout or interactivity.

Display panel 515 has a black background over which renderings are luminescent, which gives good visual contrast and prominence to the renderings. Typically, renderings are not shown at their maximum luminescence by default, so that luminescence may be increased for special emphasis when needed.

Arrowheads on spines indicate directionality of dependency relationships 78.

When layout density permits, topological connectivity (renderings that touch or overlap) is meaningful within the fishbone. By default, renderings are spaced enough apart within display panel 515, using separations 429, to allow background to appear between them. The only exception (while this default setting is in force) occurs if there is a direct dependency relationship 78 between the components that the renderings represent. Thus, connectivity indicates dependency relationship 78. This visual convention is the default in default mode 42.

The display device 639 is capable of displaying color. Fishbone layout 45 uses color in its display, but the colorings are designed, both individually and in comparison to one another, to be perceivable by users 23 who are red-green colorblind. Colorings are also designed to work acceptably with monochrome displays 639.

Fishbone Layout Techniques

This section describes techniques that govern how components of the fishbone are laid out in display panel 515.

By default, the root icon/label 321 is located near the middle of the right border of display panel 515, but any location in display panel 515 is permissible. Note that in the absence of other items to render in display panel 515, root icon/label 421 located near a border of the display panel will maximize the space available to for the rest of the fishbone.

Figure 2B:
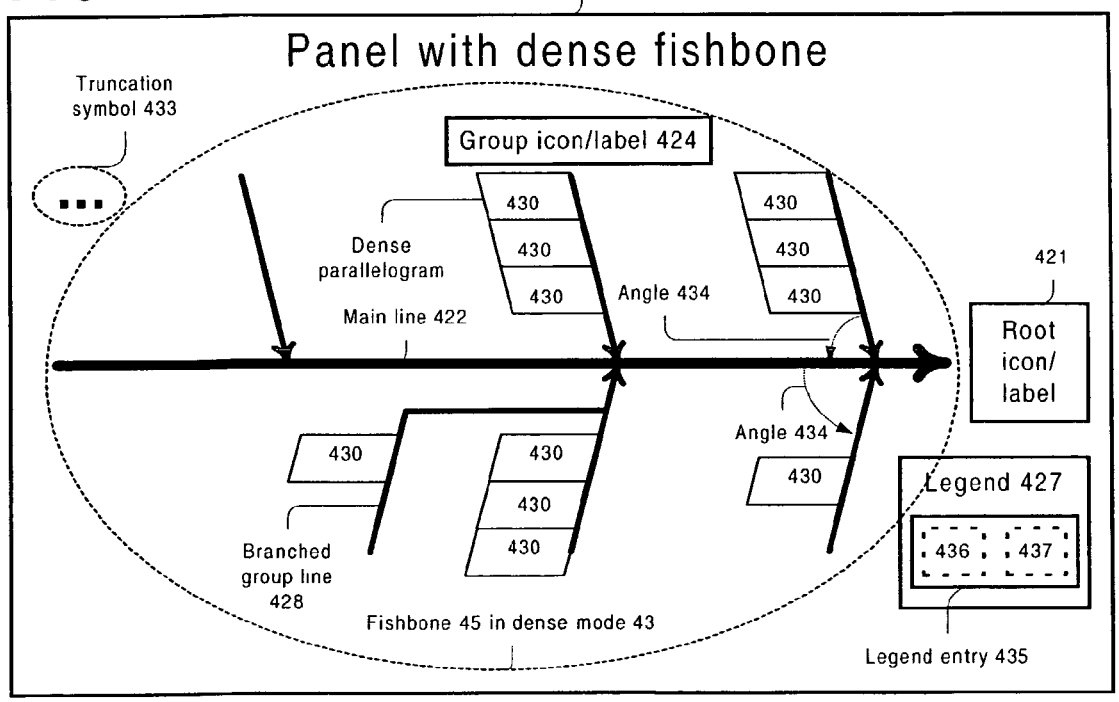
FIG. 2B illustrates a display panel including a fishbone display in a dense mode.

Root line 422 is horizontal by default, but any angle 434 is permissible. For instance, as will be explained regarding snowflake layout 46, more than two fishbone layouts 45 may share a root profile 32. In this case, the first two fishbone layouts 45 to be rendered can have horizontal root lines 422, but subsequent fishbone layouts 45 might have non-horizontal root lines 422. The slope of spines is usually in the range of 70 to 80 degrees relative to root line 422; spines to either side of root line 422 share the same angle 434 relative to root line 422, as shown in FIG. 2A and FIG. 2B.

The principle that spines are straight and substantially mutually parallel with similar spines has a special exception for branches of a spine. Spines may "branch" or "wrap" to overcome limits of a finite display region. For instance, there may be so many child resource profiles 77 to connect to a given parent that the parent's spine cannot continue in the same linear direction within display panel 515. Thus, a spine (such as a branched group line 428, shown in FIG. 2A) may branch into multiple sub-segments 446 that are substantially mutually parallel except for additional sub-segments (branch connectors 445) needed to keep the spine topologically connected. The multiple parallel sub-segments 446 can be oriented so that the spine uses less space along a given linear direction than a single segment would use. Branching therefore allows viewer 64 (shown in FIG. 8, as will be explained) to adapt the fanned-out fishbone layout 45 to finite bounds for display.

The algorithm for wrapping a spine aims to use the minimum number of branches. It assumes that viewer 64 has already detected the need to wrap. A "length-first" approach leaves room for the branch connectors 445 but then fills (i.e., renders resource profiles 77 from the branch's subtree, connecting them to a sub-segment 446) the first sub-segment 446 to its farthest permissible length before beginning to fill the additional sub-segments 446.

By default, components within a hierarchy tier are laid out alphabetically by name, starting nearest root icon/label 421 and moving away. (Other static schemes are possible and can be specified in layout preferences 754 of view record 752, shown in FIG. 8, paired with logical hierarchy 30. For instance, one may designate regions of display panel 515 relative to fishbone layout 45 in which to layout similar level-one spines: a region for servers, another for routers, a third for services, and a fourth for applications.) Standardizing a layout for each fishbone layout 45 allows user 23 to develop familiarity with that fishbone layout 45, forming a positional memory for its components. Familiarity can speed the communication of information to user 23. For instance, familiarity can eliminate the need for user 23 to investigate a component to learn the identity or context stored in its resource profile 77, allowing user 23 to interpret a change in the component's rendering more quickly. While it is possible to sort fishbones 45 dynamically (for instance, sorting by severity of the current status value 775 of each resource profile 77), in this embodiment, the default scheme is to sort on a non-dynamic property.

Display panel 515 is finite, so there is not always room to render every element, regardless of mode. In this case, when room runs out, an ellipsis or other truncation symbol 433 is displayed, as shown in FIG. 2A.

By default, coloring schemes for severity are retrieved from (or, when designing logical hierarchy 30, chosen to suit) the monitoring engine 80 which may have global coloring schemes, or schemes designed for particular uses. Matching the coloring schemes makes the integration of the status display with the monitoring engine 80 more seamless, especially for users 23 who are experienced with the monitoring engine 80, as is often the case.

In general, coloring schemes for severity include mappings that associate a given severity with a color. The given severity has a ranking on a severity scale. A severity scale provides a full ordering on severities that allows severities to be compared: for any two severities appropriate to the scale, their severity rankings will indicate whether the first is of lesser, equal, or greater rank than the second. Shorthand for explicitly saying "severity rank" is simply to say that one severity is less than, equal to, or greater than another. The colors in the coloring scheme for severity are typically chosen so as to be highly visually distinct from one another, to minimize ambiguity. Also, colors chosen to represent high severities are often more prominent (such as having stronger saturation, or are displayed with more luminescence) than color representing lesser severities. A common example of a rudimentary color scheme is green for default or problem-free severities, yellow for warning severities, and red for failure or urgent severities, with gray indicating absence of severity data or off-line.

Icons (in an icon/label) can be inflected by size, color, luminescence, shape, or animation such as blinking or quivering. Blinking is usually done only for a short period of time before returning to a non-blinking rendering: for instance, blinking to indicate a recent change of status, then stopping the blinking once the change is no longer recent.

Fishbone Interactivity

This section describes ways in which fishbone layout 45 can respond to user actions.

A left-click on a group line 423 or element line 425 selects it. Selection is indicated visually by highlighting the spine. Selecting a group icon/label highlights the whole subtree for that group. Selecting the root icon/label highlights the entire hierarchy tree.

A mouseover event occurs for a rendering of resource profile 77 when user 23 causes the mouse pointer 51 (shown in FIG. 3B) to pass over. During a mouseover of an element line 425 or element icon/label 426, the display process enlarges the font of the label and the size of the icon in the element icon/label 426, in part to make icon/label 426 easier to click on. The display process can also enlarge element line 425, especially when fishbone layout 45 is in high-density mode 43, since high-density mode 43 sometimes omits element icon/labels 426 to save space. Enlarging the target of a potential click makes it easier to see what the mouse would select if user 23 were to click. Even if user 23 does not plan to click, enlarging also makes it easier for user 23 to see the color and other traits that identify the target.

A sustained mouseover of any rendering of resource profile 77 opens a mouseover dialog 517. The mouseover is "sustained" if it lasts longer than a small, predetermined interval (usually on the order of a second, as opposed to, for instance, a millisecond). The mouseover dialog 517 contains text information about resource profile 77, including the resource name, its status, and aggregate information about events affecting it. For instance, the mouseover dialog 517 may cite:

Router 13

Congested 11 alarms over the last 30 minutes

Referring now to FIG. 2A, in the legend 427, legend graphic 436 in a legend entry 435 exemplifies a graphical convention used in fishbone layout 45. One use of a legend entry 435 is to explain a coloring or other graphical convention that represents a severity level. A sustained left-click on a legend graphic 436 in such a legend entry 435 dims the renderings of all spines except those of resource profiles 77 whose status value 775 corresponds to the severity level. This dimming emphasizes the rendering of the corresponding resource profiles.

A right-click on the rendering of resource profile 77 in fishbone layout 45 raises context menu 514, shown in FIG. 3B, containing drilldown items 516 specified by drilldown list 778 of resource profile 77. Drilldown items 516 can open reports in the analysis tools software 90 (shown in FIG. 1A) specific to resource profile 77. Drilldown items 516 can also include navigation options, such as opening fishbone layout 45 in a separate display window 50, or re-centering the current fishbone layout 45 to use the selected resource profile 77 as root. Another navigation option is to view the children of the selected resource profile 77, especially since for elements at the lowest displayed level of visual hierarchy 40, there may be additional levels of logical hierarchy 30 not currently shown in fishbone layout 45. Viewing the children may be done in a separate display window 50, or via a hierarchical menu 520 (one which opens a submenu of context menu 514 specific to a given drilldown item 516, as shown in FIG. 3B). Hierarchical menus 520 may contain drilldown items 516 that present further hierarchical menus 520.

Fishbone layout 45 can raise a provoked redraw event, as will be explained in more detail. A provoked redraw event causes the rendering engine to redraw the display panel. A provoked redraw event occurs during the initialization of client application 22, after a resizing of display window 50, or when client application 22 detects that logical hierarchy 30 has be redefined, necessitating a change in visual hierarchy 40. If the redrawn fishbone layout 45 cannot fit in the current display panel 515, user 23 is presented with a warning dialog about the truncation.

When more than one display window 50 is open, the frontmost display window 50 is called "current".

Menu Bar

Figure 6A:
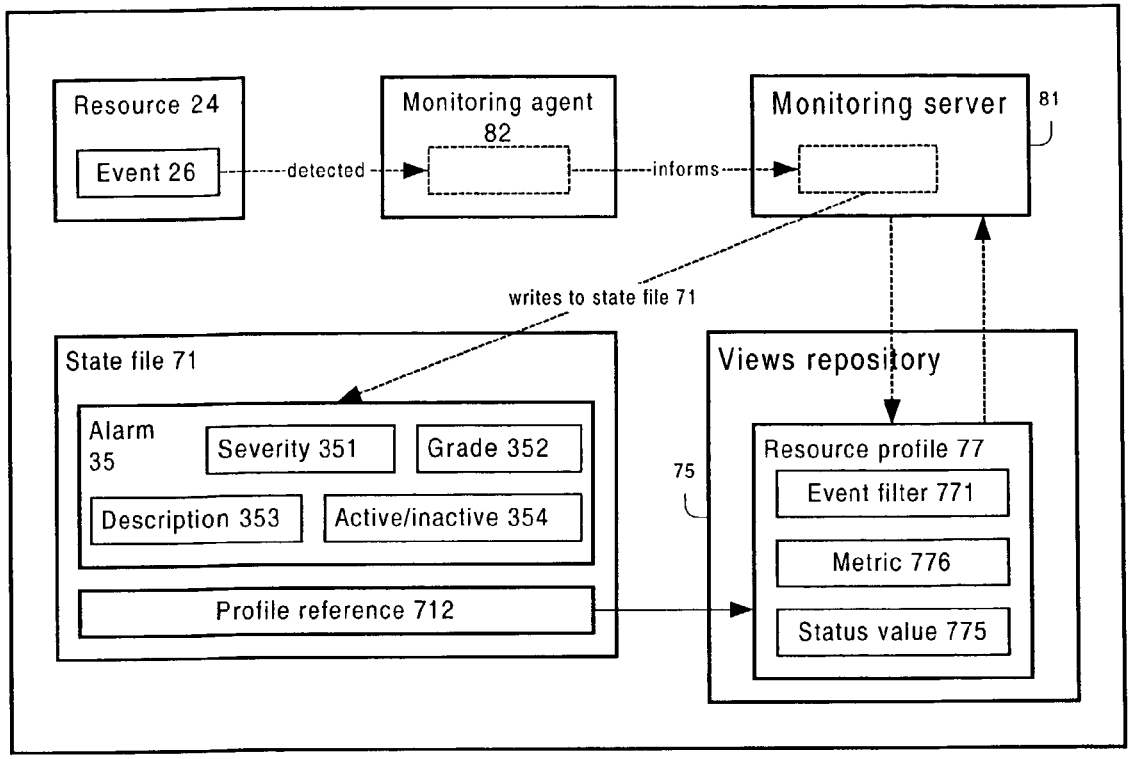
FIG. 6A shows data flow of an event.
Figure 6B:
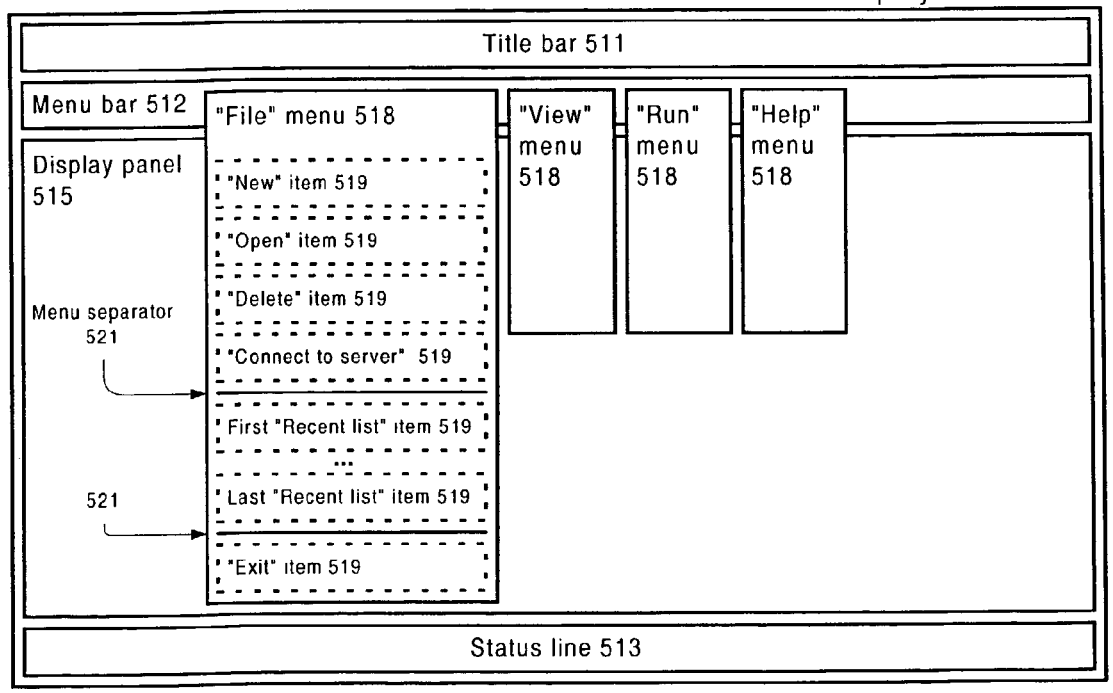
FIG. 6B shows GUI elements and techniques for a display window.

Menu bar 512 commands include the following dropdown menus 518 and dropdown items 519, as shown in FIG. 6B.

Menu bar 512 includes dropdown menus 518 labeled "File", "View", "Run", and "Help".

The "File" dropdown menu 518 includes dropdown items 519 for "New", "Open", "Delete", "Connect to server", "New window", "Recent list", and "Exit". "New" allows user 23 to select logical hierarchy 30 to open in a new display window 50, while "Open" allows the same selection but uses an existing display window 50. "Delete" allows the user to close such display window 50. "Connect to server" opens a login dialog (not shown) so that user 23 may present credentials to web server 60. "New window" opens a redundant version of the current display window 50. "Recent list" is a flexible list of several dropdown items 519, each dropdown item 519 corresponding to a recently used logical hierarchy 30. Menu separators 521 can bracket the "Recent list". "Exit" starts a process to close client application 22.

The "View" dropdown menu 518 offers dropdown items 519 affecting display, including dropdown items 519 for changing the current display window 50.

The "Run" dropdown menu 518 offers dropdown items 519 related to analysis software 90. The dropdown items 519 include an item that opens a snowflake diagram 46 of the currently-selected resource profile 77. The dropdown items 519 also include: performance reports, fault management reports (such as a list of all the alarms for the currently-selected resource profile 77), reports on the configuration of the resource 24 associated with resource profile 77, and external analysis tools 90 such as (but not limited to) ping, telnet, or management systems for the resource 24. Additionally, the user 23 can extend the list of analysis tools 90. A dropdown item 519, in its interaction with analysis tools 90, can pass information about the resource profile 77 and resource 24. Examples of this information include name of the resource profile 77, its network address, and so forth.

The "Help" dropdown menu 518 follows interface standards for operating system 631 on which client application 22 is running, e.g., Windows or Unix. For instance, for Microsoft Windows, the "Help" dropdown menu 518 includes items for "intro", "using", and "about".

Snowflake

Figure 3A:
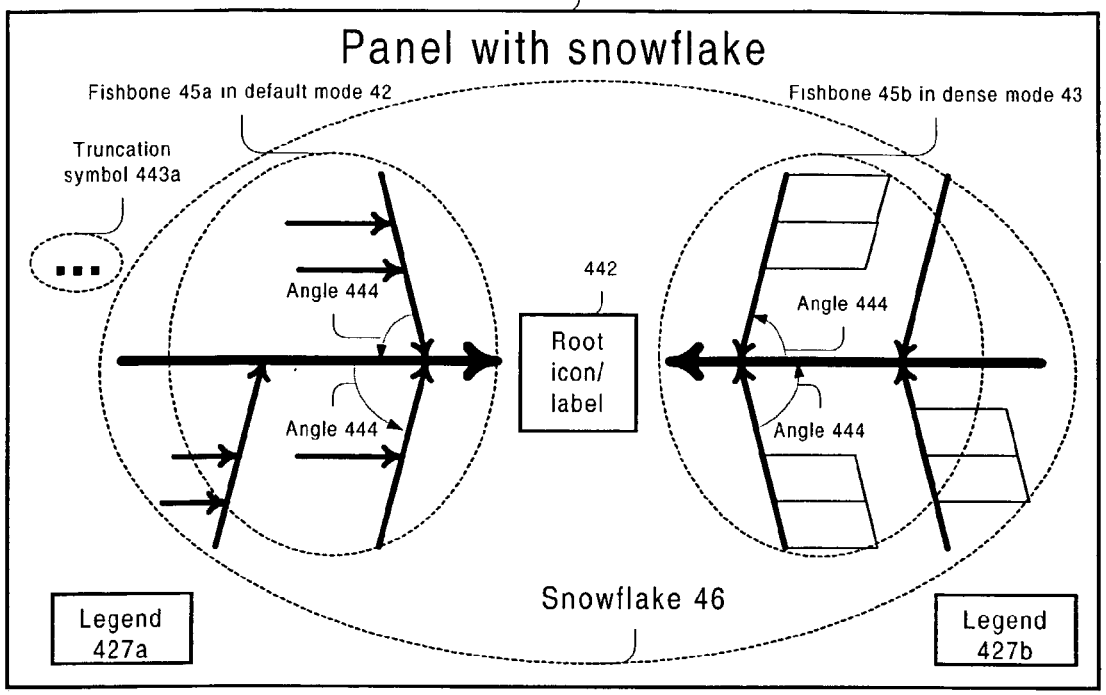
FIG. 3A illustrates a display panel including a snowflake display.
Figure 3A:
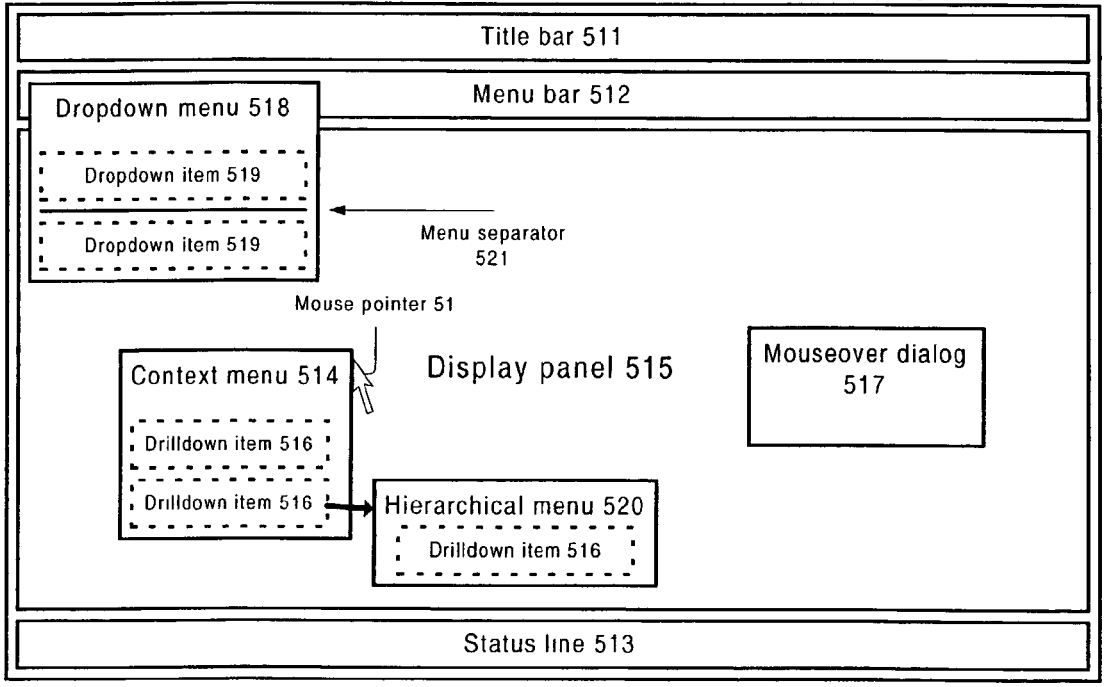

Referring to FIG. 3A, snowflake 46 is another form of display for visual hierarchy 40. Snowflake 46 displays root icon/label 442 (representing root profile 32) at the top of multiple simultaneous logical hierarchies 30, each such logical hierarchy 30 shown as fishbone layout 45 sharing the root icon/label 442. Note that each fishbone layout 45 may have its own rendering conventions as expressed in the associated view record 752. For example, as shown in FIG. 3A, a first fishbone layout 45a is rendered in default mode 42 while a second fishbone layout 45b is rendered in dense mode 43.

Snowflake layout 46 can display both consumer and provider dependency relationships 78 simultaneously. In particular, snowflake layout 46 can display root profile 32 both in terms of resource profiles 77 it consumes and provides. In the example of FIG. 3A, snowflake layout 46 includes left fishbone layout 45a arrayed to the left of root icon/label 442 and right fishbone layout 45b arrayed to the right. The left fishbone layout 45a displays resource profiles 77 consumed by root profile 32. A right fishbone layout 45b displays resource profiles 77 consuming root profile 32. In this case, fishbone layout 45a can be labeled "causes" and 45b "effects". Snowflake 46, in this configuration, graphically displays two trees of dependency relationships 78 between resource profiles 77, with root profile 32 positioned on a critical path for indirect dependency relationships 78 between any resource profile 77 in the "cause" fishbone layout 45a and resource profiles 77 in the "effect" fishbone layout 45b. By viewing snowflake layout 46, user 23 can quickly identify the probable causes of a problem by inspecting the cause fishbone layout 45a. User 23 can also identify the potential impacts of a problem by inspecting the effect fishbone layout 45b, for instance so user 23 can fix the most important problem first.

Although not shown in FIG. 3A, snowflake layout 46 can include third and subsequent fishbone layouts 45, possibly with non-horizontal root lines 422.

Client Application

This section describes the software code of client application 22. In general, it covers the main features of: presenting to the user a GUI that includes visual hierarchy 40; responding to user actions; communicating with web server 60 to access status information and logical hierarchy 30; and communicating with analysis tools 90 to enable drilldown lists 778 for resource profiles 77 in logical hierarchy 30.

Figure 7A:
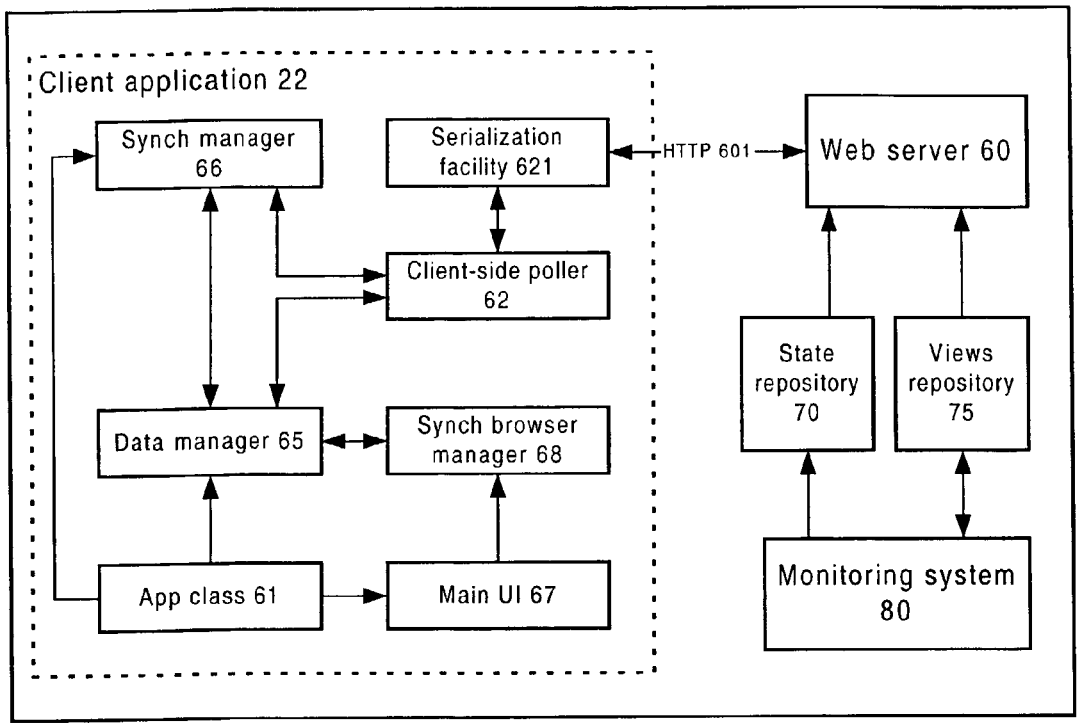
FIG. 7A illustrates software elements in a client application and servers.

Client application 22 (shown in FIG. 7A) is a Java software application. The internal architecture of client application 22 draws on object-oriented design techniques recommended for Java applications. One of these techniques is known as the Model-Delegate architecture. The Model-Delegate architecture recommends that code for user interactions be functionally separated into a Model component for modeling the data structures that will be rendered, and a Delegate component for rendering the user interface and receiving user actions, as well as for controlling program flow and execution around the Model-Delegate architecture. As will be explained, the viewer model class 69 (shown in FIG. 7B) acts as a Model component, while the viewer class 64 acts as a Delegate component.

App Class

Figure 7B:
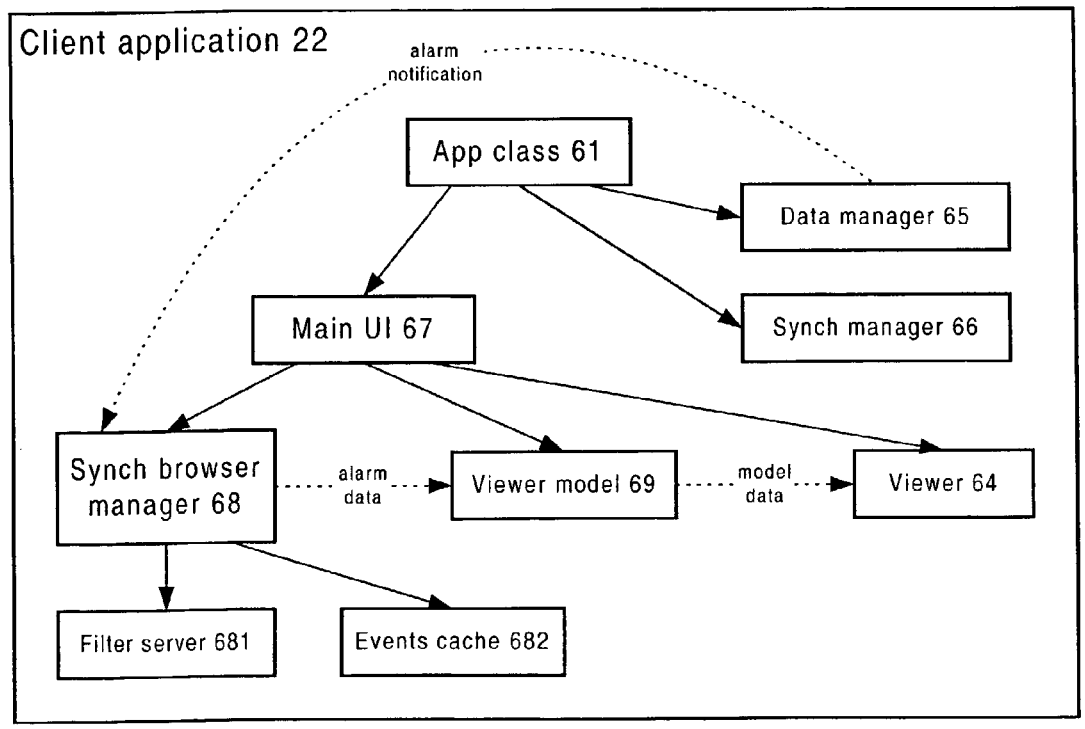
FIG. 7B illustrates software classes in a client application.

App class 61, shown in FIG. 7B, is the top-level class in the client application. App class 61 is the first class to run when client application 22 is started. Initially after startup, app class 61 launches instances of other classes, including data manager 65, synch manager 66, and main UI class 67.

Data Manager

Data manager 65 parses objects used for communicating with web server 60 to extract the information that may be multiplexed inside the object, i.e. the object may contain multiple pieces of information bound for different destinations in client application 22. A primary function of data manager 65 is to notify synch browser manager 68 (as shown in FIG. 7B) of alarms 35 as they come in.

Synch Manager

Referring now to FIG. 8, synch manager 66 caches data locally in hash tables 661 for all current-displayed logical hierarchies 30. The cached data includes logical hierarchies 30 themselves and other information from a view record 752. Synch manager 66 communicates with web server 60 to ensure that the data in the cache stays current, i.e. synchronized with the authoritative version of the data residing in the state repository 70 and views repository 75.

The hash tables 661 can store properties for each resource profile 77 including: database ID 662 identifying resource profile 77 in views repository 75; name 663; and a list of children and parents 664, each representing resource profiles 77 that are in direct dependency relationships 78 with the specified resource profile 77. By maintaining a local cache, synch manager 66 provides quick lookups of the data from a centralized place in client application 22. For instance, synch manager 66 offers a quick way to get name 663 associated with database ID 662. Name 663 is needed, for example, during a mouseover on element icon/label 426 (shown in FIG. 2A, for instance). The mouseover needs to raise a mouseover dialog 517 (shown in FIG. 3B, for instance) that includes the name of the element's resource profile 77. Rendering object 691 (as will be explained) that represented resource profile 77 has only rendering database ID 692. (Name 663 is not stored directly in rendering object 691 because name 663 can change; only the hash tables 661 have a local authoritative value for name 663). Note also that name 663 is needed fairly quickly so that user 23 will not feel that client application 22 is unresponsive. The cache is a quick way to find name 663, and it eliminates a query across the network to web server 60.

Synch manager 66 also offers quick lookups of the children or parent of a resource via list of children and parents 664.

Synch manager 66 is a singleton class within client application 22, meaning that there is only ever one instance of synch manager 66 per instance of client application 22. Thus, the synch manager 22 is unambiguous within client application 22.

When logical hierarchy 30 is opened, synch manager 66 gathers all configuration data. Synch manager 66 performs the default ordering in which the profiles will be rendered (see the section on fishbone layout techniques) as needed, by alphabetizing resource profiles 77 by name.

After the initial configuration of logical hierarchy 30 is complete, synch manager 66 goes into a maintenance loop in which it uses a configuration poll 668 (shown in FIG. 8) to poll periodically web server 60 for configuration changes to logical hierarchies 30. The configuration changes are retrieved incrementally. Configuration poll 668 does not need to retrieve the entire logical hierarchies 30 and related configuration information during every cycle. Instead, synch manager 66 retrieves complete information during initialization and subsequently uses configuration poll 668 to retrieve information that has changed since the last poll. The period of the configuration poll 668 is usually five minutes but can be adjusted by user 23.

A connection poll 669 is independent poll of the configuration poll 668. The connection poll 669 checks network communication with web server 60 to make sure the connection is still working. The connection poll 669 occurs frequently; every minute is the default.

When web server 60 responds to a configuration poll 668 with a change, the synch manager requests objects from web server 60 that describe the change.

Main UI

Main UI class 67 presents display window 50 that is the first interactive window presented by client application 22 at startup. When user 23 chooses dropdown item 519 (shown in FIG. 6B) such "New" or "Open" that opens logical hierarchy 30 for display, an instance of Main UI class 67 manages the displaying. As shown in FIG. 7B, Main UI class 67 launches objects including synch browser manager 68, viewer model 69, and viewer 64.

Synch Browser Manager

As shown in FIG. 7B, synch browser manager 68 receives notification of alarms 35 from data manager 65 and maintains the alarms in events cache 682. Recall that each instance of synch browser manager 68 is associated with an instance of Main UI class 67, which is associated with a given logical hierarchy 30. Each instance of synch browser manager 68 therefore launches filter server 681, which can distinguish alarms 35 for its associated logical hierarchy 30 from alarms 35 for other logical hierarchies 30.

When synch browser manager 68 gets alarm notifications from data manager 65 that have been passed through filter server 681, synch browser manager 68 puts alarms 35 in the events cache 682 into a Java vector object and passes the vector object to viewer model 69.

Viewer Model

Viewer model 69 is the Model component in the Model-Delegate architectural scheme. In its control capacity, viewer model 69 contains the logic that handles events raised by user 23 interacting with display window 50. More specifically, the events are detected in viewer 64 but are passed to viewer model 69 for processing. In its model capacity, viewer model 69 contains rendering objects 691 (shown in FIG. 8) that represent resource profiles 77 to be displayed by viewer 64; the purpose of rendering object 691, therefore, is to contain information about the rendering, separate from the referenced resource profiles 77. For instance, rendering object 691 for resource profile 77 contains information such as: rendering database ID 692 specifying its referenced resource profile 77; severity level 693; positional information 694; and other attributes necessary to specify the rendering.

Rendering object 691 includes redraw-ready method 696 or other means of notifying viewer 64 that rendering object 691 is ready to be redrawn.

Viewer model 69 receives a batch of alarms 35 from synch browser manager 68, packaged in a Java vector object. Viewer model 69 iterates over the vector to examine each alarm 35. Viewer model 69 locates resource profile 77 associated with alarm 35, using hash tables 661 in synch manager 66. Viewer model 69 adds alarm 35 to alarm list 773 (also a vector object in Java) of resource profile 77. After processing all alarms 35, viewer model 69 uses metric 776 of resource profile 77 to recalculate status value 775. Knowing status value 775, viewer model 69 can then set severity level 693 that the relevant rendering object 691 should associate with resource profile 77. Each such rendering object 691 uses its redraw-ready method 696 to notify viewer 64 that rendering object 691 is ready to be redrawn. Viewer model 69 also consults the cache of synch manager 66 to find associated resource profiles 77, such as parents, for the profiles 77 that received alarms 35. Viewer model 69 notifies these associated resource profiles 77 of alarms 35; this allows an associated resource profile 77 to update its own status value 775.

Viewer model 69 processes events raised by user interaction with renderings, including drill-downs and mouseovers. Viewer model 69 also processes application overrides. Drill-downs and mouseovers have already been explained. Application-wide alarm overrides 697, shown in FIG. 8, allow client application 22 to suppress certain types of alarms 35, overriding propagation rules 772 (shown in FIG. 5A) of resource profiles 77. Specifically, in the present embodiment, the CPUs of routers are not rendered as; only the router itself is rendered. This feature is added for simplicity, to reduce the amount of information present to user 23. It also allows room for more renderings of other objects. Since CPUs are not rendered, viewer model 69 aggregates router CPU alarms 35 onto the router itself. Options in drilldown list 778 of the router's resource profile 77 (shown in FIG. 5A) can still allow the user to get details about each router CPU.

Another override 697 occurs for RAS (remote access services) groups containing modems. In this case, no rendering is suppressed: both the modems and the RAS group are displayed. However, when alarm 35 occurs for a modem within a RAS group, viewer model 69 automatically associates alarm 35 with both the modem and its RAS group, regardless of the settings on the relevant resource profiles 77.

Viewer model 69 receives notice of changes to the structure of logical hierarchy 30. This causes viewer model 69 to ensure that associations of rendering objects 691 to resource profiles 77 are still accurate, and to create new rendering objects 691 for any new resource profiles 77 added by the changes. Viewer model 69 also instructs viewer 64 to redraw display panel 515 if any resource profiles 77 are added or deleted from logical hierarchy 30.

Viewer

Viewer 64 is the Delegate component in the Model-Delegate architectural scheme. Viewer 64 presents a GUI to user 23 and responds to user actions in the GUI.

Viewer 64 renders logical hierarchy 30 as visual hierarchy 40, such as fishbone layout 45 or snowflake 46, laying out visual hierarchy 40 according to an order defined in logical hierarchy 30. For this, viewer 64 uses a viewer layout class 641, shown in FIG. 8. Viewer 64 positions branches (also known as spines) within display panel 515, the branch having been rendered by a viewer branch class 642. The viewer branch class 642 wraps, truncates, and may rescale the rendering of the branch.

Viewer 64 receives user interaction events and passes them to viewer model 69. User interaction events include clicks, right-clicks, mouseovers, menu bar choices, and window resizings.

Client-Side Poller

Client-side poller 62 communicates with web server 60. Specifically, as shown in FIG. 8, client-side poller 62 uses HTTP serialization facility 621 for passing Java objects over a network; passes the serialized objects over the network via HTTP protocol 601; and web server 60 uses HTTP serialization facility 602 to receive the objects. The process runs similarly in reverse, for communication from web server 60 to client-side poller 62.

Client-side HTTP serialization facility 621 and server-side HTTP serialization facility 602 may multiplex multiple messages into one serialization object, for instance to reduce network traffic or communication overhead.

Server

Web server 60 presents an HTTP-based interface to client application 22. Via the interface, web server 60 allows client application 22 to access the state repository 70 and views repository 75. State files 71 in the state repository 70 contain information on alarms 35 and on configuration changes to logical hierarchies 30. Logical hierarchies 30 are stored in view records 752 in views repository 75, as shown in FIG. 8.

Web server 60 includes a CGI process in a web server. Web server 60 has default list 603 of logical hierarchies 30 to show, so that when user 23 of client application 22 chooses the "connect to server" dropdown item 519 from the "File" dropdown menu 518 (shown in FIG. 6B) and connects to web server 60, the default list 603 can be presented to client application 22.

State files 71 are maintained by monitor engine 80. State file 71 contains information on states of resources 24, including alarms 35 and configuration changes such as name changes. State file 71 also tracks changes to the structure of logical hierarchy 30, including additions, deletions, and rearrangements (which include changes to relationships, and the designation of a different root profile 32). State file 71 also indicates whether status information is flowing freely between resource 24 and its monitoring agent 82, shown in FIG. 4A. Interruptions of status information include administrative suspension of the monitoring service (i.e., deliberate interruptions) and problems or failures in the communications channel (inadvertent interruptions).

Views repository 75 contains both resource entities 795 (shown in FIG. 4B) and their resource profiles 77 (shown in FIG. 5A). Views repository 75 also contains logical hierarchies 30, which reference resource profiles 77 and dependency relationships 78. Views repository 75 offers editing facilities by which the contents of views repository 75 may be created and maintained by user 23. Views repository 75 may have additional features and purposes beyond those required by this embodiment. One example of a product that provides a view repository is NetworkHealth, sold by Concord Communications, Inc., of Marlboro, Mass., USA.

Monitor engine 80 writes and maintains the state files 71, and allows web server 60 to search on behalf of client application 22. Monitor engine 80 collects information for the state files 71 from monitoring agent 82 (shown in FIG. 4A), which are distributed agents that gather data on network resources 24. Monitoring agent 82 collects data about resource 24, puts the data in an ASCII file (not shown), and sends the file to monitoring server 81. Monitoring agents 82 can stop sending data for a variety of reasons, including: intentional reasons (such as for maintenance, or if monitoring is only required during business hours) or a failure or crash. If monitoring agent 82 is working, it determines, based on resource profiles 77, if a condition exists for which it should raise alarm 35. When alarm 35 occurs, monitor engine 80 writes it to state file 71 corresponding to resource profile 77.

Analysis Software

Analysis software 90 lets user 23 browse monitoring data gathered by monitor engine 80. Analysis software 90 provides snapshots that detail individual events or aggregate them, such as by sort, sum, etc. Analysis software 90 also provides live dynamic reports and historical trends.

Analysis software 90 is accessible via drilldown items 516 from fishbone layout 45.

Examples of commercially available analysis software 90 include LiveExceptions, LiveTrend, and NetworkHealth. All three are products sold by Concord Communications, Inc., of Marlboro, Mass., USA Alternate Embodiments A number of embodiments of the invention have been described. Nevertheless, it will be understood that various modifications may be made without departing from the spirit and scope of the invention. For example, monitor engine 80 need not collect data from monitoring agents 82 in order to maintain the state files 71; it could have some other source of information. Client application 22 need not poll the web server 80 to download or "pull down" data; data could be sent from web server 60 using a "push" architecture, i.e., one in which data is sent to client application 22 without client application 22 having to poll for it. Display panel 515 containing fishbone layout 45 or snowflake 46 could allow scrolling rather than truncating the display; this could be accomplished via scroll bars. Although FIG. 3A shows snowflake layout 46 including two fishbone layouts 45, snowflake layout 46 can contain more than two fishbone layouts 45.

At least two approaches exist for wrapping a spine using the minimum number of branches. The length-first approach has been described. Another embodiment uses a "balancing" approach that distributes the sub-segments 446, shown in FIG. 2A, so that each sub-segment 446 is roughly the same length.

As suits the underlying logical hierarchy 30, spines within a fishbone layout 45 may be uniformly directed toward root icon/label 421, may be uniformly directed away from root icon/label 421, or may be arranged with a variety of directions within a given fishbone layout 45, with respect to root icon/label 421.

In the described embodiment, client application 22 is written in the Java programming language, in part because Java offers portability of applications onto a wide range of operating systems and computing platforms. However, other programming languages could be used instead of Java.

Accordingly, other embodiments are within the scope of the following claims.

What is claimed is:

1. A computer-based method for displaying the status of networked resources, including:

representing a hierarchy, the hierarchy including a plurality of resource profiles and a plurality of dependency relationships among resource profiles in the plurality of resource profiles, where the resource profiles represent networked resources;

acquiring a status of at least one monitored resource profile in the plurality of resource profiles; and rendering the hierarchy in a fishbone layout, including rendering a visual representation of the status of the monitored resource profile.

2. The method of claim 1, further including:

acquiring a status of a monitored resource having a monitored resource profile in the fishbone layout; and updating the fishbone layout to reflect the acquired status.

3. The method of claim 2, wherein acquiring the status includes repeatedly acquiring the status at regular intervals.

4. The method of claim 3, wherein repeatedly acquiring the status includes acquiring information about properties of the monitored resource that have changed in a most recent interval among the regular intervals.

5. The method of claim 4, wherein the monitored resource profile includes a propagation rule for how the acquired status should propagate to dependent resource profiles in consumer dependency relationships with the monitored resource profile; and
    wherein updating the fishbone layout includes updating the rendering of the dependent resource profiles.

6. The method of claim 1, wherein the rendering first displays the fishbone layout in a display panel, using a first density mode of the fishbone layout; and further including:
    replacing the first density mode with a second density mode.

7. The method of claim 6, wherein the replacing is in response to a change in the ratio of members of the fishbone layout to a size of the display panel.

8. The method of claim 6, wherein the first density mode of the fishbone layout is a standard mode that renders a tier-two resource profile as a spine, and the second density mode is a mode for rendering components of the fishbone layout at a higher density, relative to the first density mode.

9. The method of claim 6, wherein the first density mode of the fishbone layout is a mode for rendering components of the fishbone layout at a higher density, relative to the second density mode, and the second density mode is a standard mode that renders a tier-two resource profile as a spine.

10. The method of claim 6, wherein:
    an instance of topological connectivity between a rendering of a first resource profile and a rendering of a second resource profile in the fishbone layout corresponds to an immediate dependency relationship between the first resource profile and the second resource profile, and
    an absence of topological connectivity between the rendering of a first resource profile and a rendering of a third resource profile in the fishbone layout corresponds to an absence of any immediate dependency relationship between the first resource profile and the third resource profile.

11. The method of claim 10, wherein the second density mode of the fishbone layout is a dense mode that renders a tier-two resource profile as a parallelogram.

12. The method of claim 1, further including:
    presenting a summary dialog that describes a component of the fishbone layout in response to a sustained mouseover.

13. The method of claim 1, further including:
    displaying a context menu for a component of the fishbone layout in response to a right-click on the component, the context menu including a drill-down list offering procedures to invoke on the component.

14. The method of claim 13, wherein the context menu is customized to the component.

15. The method of claim 13, wherein a procedure in the drill-down list invokes, in response to a selection by the user, a report in a network analysis tool.

16. The method of claim 13, wherein a procedure in the drill-down list causes a re-rendering of the fishbone layout in response to a selection by the user, and wherein the fishbone layout has a root, and the component becomes the root of the fishbone layout.

17. The method of claim 13, wherein a procedure in the drill-down list opens, in response to a selection by the user, a new display panel having a fishbone layout, the fishbone layout having a root and using the component as the root.

18. The method of claim 13, wherein a procedure in the drill-down list opens, in response to a selection by the user, a new snowflake display having a root and using the component as the root.

19. A computer-based method for displaying the status of networked resources, including:
    providing a hierarchy including a root resource profile and a plurality of dependent resource profiles in dependency relationships with the root resource profile, such that a minimal path from each dependent resource profile to the root resource profile, the path including a sequence of dependency relationships, has a path length corresponding to a tier in the hierarchy for each such dependent resource profile, and where the resource profiles represent networked resources;
    acquiring a status of a monitored resource profile, the monitored resource profile either being the root resource profile or being in the plurality of dependent resource profiles;
    associating the status with a severity; and
    rendering the hierarchy in a fishbone layout, including rendering the monitored resource profile with a visual trait indicating the severity.

20. The method of claim 19, wherein the visual trait includes a color selected from a plurality of colors representing a severity scale.

21. The method of claim 20, wherein associating the status with a severity includes using a status metric associated with the monitored resource profile.

22. The method of claim 21, further including:
    acquiring notice of a change in the status;
    updating the severity; and
    re-rendering the hierarchy in a fishbone layout, to include rendering the monitored resource profile to indicate the updated severity.

23. The method of claim 22, wherein updating the severity includes applying an application-wide override to deviate from a behavior indicated by the status metric.

24. The method of claim 23, wherein the deviation includes suppressing a change in severity.

25. The method of claim 19, wherein the fishbone layout is included in a snowflake layout.

26. A computer-based method for displaying the status of networked resources, including:
    representing a logical hierarchy, the logical hierarchy including a plurality of resource profiles and a plurality of dependency relationships among resource profiles in the plurality of resource profiles, where the resource profiles represent networked resources;
    acquiring a status of at least one monitored resource profile in the plurality of resource profiles;
    deriving a visual hierarchy from the logical hierarchy, wherein components of the visual hierarchy correspond to components of the logical hierarchy, such that the visual hierarchy is a tree; and
    rendering the visual hierarchy in a fishbone layout, including rendering a visual representation of the status of the monitored resource profile.

27. The method of claim 26, wherein the visual hierarchy is a directed tree.

28. The method of claim 26, wherein the fishbone layout is included in a snowflake layout.

29. A computing apparatus for displaying the status of networked resources comprising:
    a computer usable medium having computer readable program code means embodied therein, including a processor, a main memory, a visual display, a storage device, and a network connection, the program code means comprising:
    computer readable program code means for causing a computer to represent a hierarchy including a plurality of resource profiles and a plurality of dependency relationships among resource profiles in the plurality of resource profiles, where the resource profiles represent networked resources;

computer readable program code means for causing the computer to acquire a status of a monitored resource profile in the plurality of resource profiles; and computer readable program code means for causing the computer to render the hierarchy in a fishbone layout, including rendering a visual representation of the status of the monitored resource profile.

30. A computer-based method for displaying the status of networked resources, including:

representing a plurality of hierarchies, each of the hierarchies including a plurality of resource profiles and a plurality of dependency relationships among resource profiles in the plurality of resource profiles, where the resource profiles represent networked resources, wherein the hierarchies share a common root;

acquiring a status of at least one monitored resource profile in the plurality of resource profiles; and rendering the plurality of hierarchies in a fishbone snowflake layout, including rendering a visual representation of the status of the monitored resource profile.

31. The method of claim 30, further including:

acquiring a status of a monitored resource having a monitored resource profile in the fish bone snowflake layout; and updating the fishbone snowflake layout to reflect the acquired status.

32. The method of claim 31, wherein acquiring the status includes repeatedly acquiring the status at regular intervals.

33. The method of claim 32, wherein repeatedly acquiring the status includes acquiring information about properties of the monitored resource that have changed in the most recent interval among the regular intervals.

34. The method of claim 31, wherein the monitored resource profile includes a propagation rule for how the acquired status should propagate to dependent resource profiles in consumer dependency relationships with the monitored resource profile; and wherein updating the snowflake layout includes updating the rendering of the dependent resource profiles.

35. The method of claim 30, wherein the rendering first displays a fishbone layout in the plurality of fishbone layouts in a display panel, using a first density mode of the fishbone layout; and further including:

replacing the first density mode with a second density mode.

36. The method of claim 35, wherein the replacing is in response to a change in the ratio of members of the fishbone layout to a size of the display panel.

37. The method of claim 35, wherein the first density mode of the fishbone layout is a standard mode that renders a tier-two resource profile as a spine, and the second density mode is a mode for rendering components of the fishbone layout at a higher density, relative to the first density mode.

38. The method of claim 35, wherein the first density mode of the fish bone layout is a mode for rendering components of the fishbone layout at a higher density, relative to the second density mode, and the second density mode is a standard mode that renders a tier-two resource profile as a spine.

39. The method of claim 35, wherein:

an instance of topological connectivity between a rendering of a first resource profile and a rendering of a second resource profile in the fishbone layout corresponds to an immediate dependency relationship between the first resource profile and the second resource profile, and an absence of topological connectivity between the rendering of a first resource profile and a rendering of a third resource profile in the fishbone layout corresponds to an absence of any immediate dependency relationship between the first resource profile and the third resource profile.

40. The method of claim 36, wherein the second density mode of the fishbone layout is a dense mode that renders a tier-two resource profile as a parallelogram.

41. The method of claim 30, further including:

presenting a summary dialog describing a component of the fishbone layout in response to a sustained mouseover.

42. The method of claim 30, further including:

displaying a context menu for a component of the fishbone layout in response to a right-click on the component, the context menu including a drill-down list offering procedures to invoke on the component.

43. The method of claim 42, wherein the context menu is customized to the component.

44. The method of claim 42, wherein a procedure in the drill-down list invokes, in response to a selection by the user, a report in a network analysis tool.

45. The method of claim 42, wherein a procedure in the drill-down list causes a re-rendering of the fishbone layout in response to a selection by the user, and wherein the fishbone layout has a root, and the component becomes the root of the fishbone layout.

46. The method of claim 42, wherein a procedure in the drill-down list opens, in response to a selection by the user, a new display panel having a fishbone layout, the fishbone layout having a root and using the component as the root.

47. The method of claim 42, wherein a procedure in the drill-down list opens, in response to a selection by the user a new snowflake display having a root and using the component as the root.

48. A computing apparatus for displaying the status of networked resources comprising:

a computer usable medium having computer readable program code means embodied therein, including a processor, a main memory, a visual display, a storage device, and a network connection, the program code means comprising:

computer readable program code means for causing a computer to represent a plurality of hierarchies, each of the hierarchies including a plurality of resource profiles and a plurality of dependency relationships among resource profiles in the plurality of resource profiles, where the resource profiles represent networked resources, wherein the hierarchies share a common root;

computer readable program code means for causing the computer to acquire a status of at least one monitored resource profile in the plurality of resource profiles; and computer readable program code means for causing the computer to render the plurality of hierarchies in a fishbone snowflake layout, including rendering a visual representation of the status of the monitored resource profile.

* * * * *